(12) United States Patent
Melodia et al.

(10) Patent No.: US 12,230,150 B2
(45) Date of Patent: Feb. 18, 2025

(54) SOFTWARE DEFINED DRONE NETWORK CONTROL SYSTEM

(71) Applicant: Northeastern University, Boston, MA (US)

(72) Inventors: Tommaso Melodia, Newton, MA (US); Lorenzo Bertizzolo, Boston, MA (US); Zhangyu Guan, Chestnut Hill, MA (US); Salvatore D'Oro, Allston, MA (US)

(73) Assignee: Northeastern University, Boston, MA (US)

( * ) Notice: Subject to any disclaimer, the term of this patent is extended or adjusted under 35 U.S.C. 154(b) by 495 days.

(21) Appl. No.: 17/603,050

(22) PCT Filed: Feb. 12, 2020

(86) PCT No.: PCT/US2020/018004
§ 371 (c)(1),
(2) Date: Oct. 12, 2021

(87) PCT Pub. No.: WO2020/209935
PCT Pub. Date: Oct. 15, 2020

(65) Prior Publication Data
US 2022/0189320 A1 Jun. 16, 2022

Related U.S. Application Data

(60) Provisional application No. 62/833,608, filed on Apr. 12, 2019.

(51) Int. Cl.
*G08G 5/00* (2006.01)
*B64U 101/20* (2023.01)

(52) U.S. Cl.
CPC .......... *G08G 5/0043* (2013.01); *G08G 5/0013* (2013.01); *G08G 5/0026* (2013.01);
(Continued)

(58) Field of Classification Search
CPC .. G08G 5/0043; G08G 5/0013; G08G 5/0026; G08G 5/0069; B64U 2101/20; B64C 39/024
See application file for complete search history.

(56) References Cited

U.S. PATENT DOCUMENTS 7,263,496 B1   8/2007   Weigelt et al.
8,214,098 B2   7/2012   Murray et al.
(Continued)

OTHER PUBLICATIONS

Hakiri et al., "Software-Defined Netorking: Challenges and research opportunities for Future Internet", Oct. 19, 2014 (Oct. 19, 2014); Computer Networks 75 (2014) 453-471 doi: 10.1016/j.comnet.2014.10.015.
(Continued)

*Primary Examiner* — Naeem Taslim Alam
(74) *Attorney, Agent, or Firm* — Verrill Dana, LLP

(57) ABSTRACT

Methods and systems are provided for controlling an unmanned aerial vehicle (UAV) swarm network including receiving, at a control terminal, an operator input defining a plurality of network performance directives, constructing a network control model representing the plurality of network performance directives, decomposing the network control model into a plurality of sub-models, generating, via the control terminal, a distributed UAV control model corresponding to each of the distributed sub-models, transmitting the generated distributed UAV control models to each of a plurality of UAVs of the UAV swarm network, executing, at each of the plurality of UAVs, at least one of the distributed UAV control models, and changing, responsive to the execution of the distributed UAV control models, an operating condition of at least one of the plurality of UAVs to satisfy the network performance directives.

14 Claims, 20 Drawing Sheets

(52) U.S. Cl.
CPC ....... *G08G 5/0069* (2013.01); *B64U 2101/20* (2023.01); *B64U 2201/00* (2023.01)

(56) References Cited

U.S. PATENT DOCUMENTS

| | | | |
|---|---|---|---|
| 8,844,041 B1 | 9/2014 | Kienzle et al. | |
| 9,545,995 B1 | 1/2017 | Chau et al. | |
| 9,973,261 B1* | 5/2018 | Hardy | H04W 4/06 |
| 10,035,593 B2* | 7/2018 | Shukla | G08G 5/006 |
| 2004/0030570 A1 | 2/2004 | Solomon | |
| 2005/0007997 A1 | 1/2005 | Morton et al. | |
| 2007/0011437 A1 | 1/2007 | Carnahan | |
| 2007/0111757 A1 | 5/2007 | Cao et al. | |
| 2008/0144562 A1 | 6/2008 | Draper et al. | |
| 2008/0165703 A1 | 7/2008 | Deng | |
| 2008/0219268 A1 | 9/2008 | Dennison | |
| 2009/0099995 A1 | 4/2009 | Tzeng | |
| 2009/0112784 A1 | 4/2009 | Brun et al. | |
| 2009/0129316 A1 | 5/2009 | Ramanathan et al. | |
| 2010/0192013 A1 | 7/2010 | Krishnan et al. | |
| 2010/0271989 A1 | 10/2010 | Chernoguzov et al. | |
| 2011/0205929 A1 | 8/2011 | Quek et al. | |
| 2012/0005251 A1 | 1/2012 | Xie et al. | |
| 2015/0195126 A1 | 7/2015 | Vasseur et al. | |
| 2016/0156406 A1* | 6/2016 | Frolov | H04W 16/28 455/431 |
| 2016/0156513 A1 | 6/2016 | Zhang et al. | |
| 2016/0156733 A1 | 6/2016 | Farhadi et al. | |
| 2016/0191306 A1 | 6/2016 | Gasparakis et al. | |
| 2016/0219024 A1 | 7/2016 | Verzun et al. | |
| 2018/0102831 A1* | 4/2018 | Murphy | H04W 64/00 |
| 2018/0136647 A1* | 5/2018 | Gurdan | G08G 5/0013 |
| 2018/0253093 A1 | 9/2018 | Augugliaro et al. | |
| 2019/0086938 A1 | 3/2019 | Shattil | |

OTHER PUBLICATIONS

Guan et al., "WNOS: An Optimization-based Wireless Network Operating System", Dec. 22, 2017 (Dec. 22, 2017); Association for Computing Machinery, 18 pages.

Ding et al., "Distributed resource allocation in cognitive and cooperative ad hoc networks through joint routing, relay selection and spectrum allocation", Computer Networks 83 (2015) 315-331 doi.org/10.1016/j.comnet.2015.02.027.

M. Abolhasan, J. Lipman, W. Ni, and B. Hagelstein, "Software-Defined Wireless Networking: Centralized, Distributed, or Hybrid?," IEEE Network, vol. 29, pp. 32-38, Jul./Aug. 2015.

M. Bansal, J. Mehlman, S. Katti, and P. Levis, "OpenRadio: A Programmable Wireless Dataplane," in Proc. of HotSDN, Helsinki, Finland, Aug. 2012.

A. Gudipati, D. Perry, L. E. Li, and S. Katti, "SoftRAN: Software Defined Radio Access Network," in Proc. of HotSDN, Hong Kong, China, Aug. 2013.

X. Jin, L. E. Li, , and J. Rexford, "CellSDN: Software-Defined Cellular Networks," Technical Report, 2012. Online Available. ftp://ftp.cs.princeton.edu/techreports/2012/922.pdf.

E. Demirors, G. Sklivanitis, T. Melodia, and S. Batalama, "RcUBe: Real-Time Reconfigurable Radio Framework with Self-Optimization Capabilities," in Proc. of IEEE Secon, Seattle, WA, Jun. 2015.

M. Zhu, J. Cao, D. Pang, Z. He, and M. Xu, "SDN-Based Routing for Efficient Message Propagation in VANET," in Wireless Algorithms, Systems, and Applications (K. Xu and H. Zhu, eds.), pp. 788-797, New York City, USA: Springer International Publishing, 2015.

L. Galluccio, S. Milardo, G. Morabito, and S. Palazzo, "SDN-WISE: Design, prototyping and experimentation of a stateful SDN solution for Wireless SEnsor networks," in Proc. IEEE Infocom, Hong Kong, Apr. 2015.

M. ZImmerling, F. Ferrari, L. Mottola, T. Voigt, and L. Thiele, "pTUNES: Runtime Parameter Adaptation for Low-power MAC Protocols," in in Proc. ACM/IEEE International Conference on Information Processing in Sensor Networks (IPSN), Beijing, China, Apr. 2012.

T. Luo, H.-P. Tan, and T. Q. S. Quek, "Sensor OpenFlow: Enabling Software-Defined Wireless Sensor Networks," IEEE Communications Letters, vol. 16, pp. 1896-1899, Nov. 2012.

S. Vissicchio, O. Tilmans, L. Vanbever, and J. Rexford, "Central Control Over Distributed Routing," in Proc. of ACM SIGCOMM, London, United Kingdom, Aug. 2015.

M. Chiang, "Balancing Transport and Physical Layers in Wireless Multihop Networks: Jointly Optimal Congestion Control and Power Control," IEEE JSAC, vol. 23, pp. 104-116, Jan. 2005.

R. H. Byrd, M. E. Hribar, and J. Nocedal, "An Interior Point Algorithm for Large-Scale Nonlinear Programming," SIAM Journal on Optimization, vol. 9, No. 4, pp. 877-900, 1999.

R. H. Byrd, J. C. Gilbert, and J. Nocedal, "A Trust Region Method Based on Interior Point Techniques for Nonlinear Programming," Mathematical Programming, vol. 89, No. 1, pp. 149-185, 2000.

\* cited by examiner

SOFTWARE DEFINED DRONE NETWORK CONTROL SYSTEM

STATEMENT REGARDING FEDERALLY SPONSORED RESEARCH OR DEVELOPMENT

This invention was made with government support under Grant Number FA8750-18-C-0122 awarded by the Air Force Research Laboratories. The government has certain rights in the invention.

BACKGROUND

Networks of Unmanned Aerial Vehicles ("UAVs" or "drones"), composed of hundreds, even thousands of highly mobile, battery powered, and wirelessly connected flying drones, are envisioned to take a vital role in future Internet of Things (IoT) and 5G networks, thus paving the way for a variety of military and commercial applications. However, how to control UAV networks in an automated, flexible, and scalable fashion in distributed, interference-prone, and potentially adversarial environments, is still an open problem.

Intelligent UAVs are attracting the interest of the networking community as a "tool" to provide new capabilities, to extend the infrastructure of wireless networks, and to make it more flexible. Thanks to their unique characteristics such as fast deployment, high mobility, processing capabilities, and reduced size, UAVs are an enabling technology for numerous future wireless applications. Among these, increasing network coverage, providing advanced network services such as location-aware content delivery and massive MIMO transmissions are notable. UAV-aided wireless networks will enable present and future Internet of Things (IoT) and 5G applications, and will be a driver for new military and civilian applications spanning battlefield inspection, border control and aerial surveillance, precision agriculture, environmental monitoring, transportation and delivery of goods.

While networks of UAVs can certainly enable a broad range of new applications, how to design simple, elastic, and optimal strategies to control their behavior is still a challenging and open issue. First, commercially available UAVs rely on inflexible wireless interfaces (e.g., Wi-Fi), which are sensitive to spatially and temporally varying topologies, dynamic RF environments, and adversarial attacks. For this reason, even basic functionalities such as network formation and point-to-point communications are impaired by unstable channel conditions and fragile network connectivity typical of infrastructure-less aerial scenarios. Second, traditional network control schemes often rely on the assumption that the network operator is aware of low-level network infrastructure details and protocol implementations (e.g., UAVs location, network topology, spectrum availability, and modulation schemes); an assumption that often does not hold in distributed aerial networks. Moreover, controlling the network behavior in a dynamic environment also requires deep understanding of the interactions between flight control and networking functionalities at all layers of the network protocol stack. At present, a widely accepted framework for controlling the networking and motion functionalities of large-scale UAV networks is still missing.

SUMMARY OF THE INVENTION

Provided herein are systems and methods for automated control of distributed UAV swarm-based wireless networks. Such systems and methods use automatic decomposition theories and distributed network control principles to provide the Network Operator (NO) with a unified control input for both the networking and flight control functionalities to establish a network control framework. The systems and methods described herein therefore provide the NO with the ability to define and implement complex network control problems by specifying high-level control directives for the UAV networks at a centralized terminal. In general, the control framework (i) constructs a network control problem ("NCP") (also referred to as a "network control model") representation of the directives of the NO; (ii) decomposes it into a set of distributed sub-models; and (iii) automatically generates distributed UAV control models to be executed at individual UAVs.

In some instances, the flexibility of software-defined radio (SDR) can be employed to implement the control framework. In such instances, the systems and methods described herein can provide an SDR-based, fully reconfigurable UAV network platform for implementing the control framework. The technology provides a unified control input for directing the motion and networking functionalities of UAV swarm wireless networks, a unified control framework for both networking and flight control, a self-organizing and self-optimizing UAV swarm network, and distributed drone network control.

More generally, by providing both a unified control input and a unified control framework, the methods and systems provided herein can be used by a network operator to define the desired network behavior through a few lines of code and without any required knowledge of the low-layer network details, network protocol infrastructure, or the distributed control problem implementation. Thus, the systems and methods provided herein provide distributed network control capabilities to non-technical network operators.

As described in greater detail below, the effectiveness and flexibility of the systems and methods describe herein have been assessed with extensive flight experiments. Those experimental results show that the systems and methods provided herein facilitate fast, automated network reconfiguration. Moreover, such systems and methods can achieve an average throughput gain of 159% compared to existing solutions.

UAVs and UAV swarms are likely to become increasingly useful for future wireless applications. In particular, characteristics such as fast deployment, high mobility, improved processing capabilities, and reduced size are all beneficial for numerous wireless applications, including, for example, increasing network coverage, providing advanced network services such as location-aware content, and massive MIMO transmissions. Drone-aided wireless networks are also deployable to mitigate or overcome the inflexibility and deployment costs of ground infrastructure, resulting in significant financial advantage. Furthermore, it will be apparent in view of this disclosure that, in addition to UAV swarm networks, the systems and methods described herein can also be used in connection with 5G new radio, the Internet of Things, or any other network including mobile wireless nodes.

In one features, a method for controlling an unmanned aerial vehicle (UAV) swarm network is provided. The method includes the feature of receiving, at a control terminal, an operator input defining a plurality of network performance directives. The method also includes the feature of constructing a network control model representing the plurality of network performance directives. The method also includes the feature of decomposing the network control model into a plurality of sub-models. The method also includes the feature of generating, via the control terminal, a distributed UAV control model corresponding to each of the distributed sub-models. The method also includes the feature of transmitting the generated distributed UAV control models to each of a plurality of UAVs of the UAV swarm network. The method also includes the feature of executing, at each of the plurality of UAVs, at least one of the distributed UAV control models. The method also includes the feature of changing, responsive to the execution of the distributed UAV control models, an operating condition of at least one of the plurality of UAVs to satisfy the network performance directives.

The features of the method can also include wherein the plurality of network performance directives includes prioritization, quantification, or both of one or more of energy consumption, QoS requirements, network protocols, network throughput, network data rate, geographic network coverage, or combinations thereof. The features of the method can also include wherein the plurality of network performance directives includes prioritization, quantification, or both of one or more of geographic UAV location; altitude; flight speed; dwell time; proximity requirements; return-to-base conditions, or combinations thereof. The features of the method can also include wherein the return-to-base conditions include a minimum threshold detected battery life, a prescribed return time, a failure detection, detection of an atmospheric condition, impact detection, or combinations thereof. The features of the method can also include wherein the step of executing further comprises retrieving real-time network state information. The features of the method can also include wherein the real-time network state information includes one or more of locations of the plurality of UAVs, network signal to noise ratio (SNR), routing tables, queue status, battery level of the plurality of UAVs, ground distance, TCP congestion window, routing path, transmission power, modulation scheme, or combinations thereof. The features of the method can also include wherein the step of changing an operating condition further comprises controlling one or more of a flight computer, a motor, a sensor, a camera, a propeller, a fan, an actuator, a servo, a control surface, or combinations thereof to change one or more of an altitude of the UAV, a trajectory of the UAV, a velocity of the UAV, an attitude of the UAV, a flight pattern of the UAV, or combinations thereof. The features of the method can also include wherein the step of changing an operating condition further comprises controlling one or more of an antenna, a sensor, a camera, a transceiver, a software-defined radio, a network router, or combinations thereof to change one or more of a broadcast power, a transmission pattern, a transmission direction, a receive direction, a receive pattern, a network protocol, or combinations thereof.

The features of the method can also include wherein the step of decomposition is performed by one or more of horizontal decomposition, vertical decomposition, or combinations thereof. The features of the method can also include wherein the step of decomposition is performed by one or more of partial linearization, Taylor series linearization, Lagrangian duality, or combinations thereof. The features of the method can also include retrieving updated real-time network state information. The features of the method can also include executing, at each of the plurality of UAVs responsive to retrieval of the updated real-time network state information, at least one of the distributed UAV control models, at least one updated distributed UAV control model, or a combination thereof. The features of the method can also include changing, responsive to the execution of the distributed UAV control models or updated distributed UAV control models, a current operating condition of at least one of the plurality of UAVs.

In some features, a system for controlling an unmanned aerial vehicle (UAV) swarm network is provided. The system includes the feature of a control terminal, having a memory and a processor. The system also includes the feature of the memory including instructions that, when executed by the processor cause the control terminal to receive an input defining a plurality of network performance directives. The system also includes the feature of the memory including instructions that, when executed by the processor cause the control terminal to construct a network control model representing the plurality of network performance directives. The system also includes the feature of the memory including instructions that, when executed by the processor cause the control terminal to decompose the network control model into a plurality of sub-models. The system also includes the feature of the memory including instructions that, when executed by the processor cause the control terminal to generate a distributed UAV control model corresponding to each of the distributed sub-models. The system also includes the feature of the memory including instructions that, when executed by the processor cause the control terminal to transmit the generated distributed UAV control models to each of a plurality of UAVs of the UAV network. The system also includes the feature of a plurality of UAVs. The system also includes the feature of the plurality of UAVs each configured to execute at least one of the distributed UAV control models. The system also includes the feature of the plurality of UAVs each configured to change, responsive to the execution of the distributed UAV control models, an operating condition of at least one of the plurality of UAVs to satisfy the network performance directives.

The features of the system can also include wherein the plurality of network performance directives includes prioritization, quantification, or both of one or more of energy consumption, QoS requirements, network protocols, network throughput, network data rate, geographic network coverage, or combinations thereof. The features of the system can also include wherein the plurality of network performance directives includes prioritization, quantification, or both of one or more of geographic UAV location; altitude; flight speed; dwell time; proximity requirements; return-to-base conditions, or combinations thereof. The features of the system can also include wherein the return-to-base conditions include a minimum threshold detected battery life, a prescribed return time, a failure detection, detection of an atmospheric condition, impact detection, or combinations thereof. The features of the system can also include wherein executing at least one of the distributed UAV control models further comprises retrieving real-time network state information. The features of the system can also include wherein the real-time network state information includes one or more of locations of the plurality of UAVs, network signal to noise ratio (SNR), routing tables, queue status, battery level of the plurality of UAVs, ground distance, TCP congestion window, routing path, transmission power, modulation scheme, or combinations thereof. The features of the system can also include wherein the change to the operating condition further comprises controlling one or more of a flight computer, a motor, a sensor, a camera, a propeller, a fan, an actuator, a servo, a control surface, or combinations thereof to change one or more of an altitude of the UAV, a trajectory of the UAV, a velocity of the UAV, an attitude of the UAV, a flight pattern of the UAV, or combinations thereof. The features of the system can also include wherein the change to the operating condition further comprises controlling one or more of an antenna, a sensor, a camera, a transceiver, a software-defined radio, a network router, or combinations thereof to change one or more of a broadcast power, a transmission pattern, a transmission direction, a receive direction, a receive pattern, a network protocol, or combinations thereof.

The features of the system can also include wherein decomposing the network control model further comprises one or more of horizontal decomposition, vertical decomposition, or combinations thereof. The features of the system can also include wherein decomposing the network control model further comprises one or more of partial linearization, Taylor series linearization, Lagrangian duality, or combinations thereof. The features of the system can also include wherein the each of the plurality of UAVs is further configured to retrieve updated real-time network state information. The features of the system can also include wherein the each of the plurality of UAVs is further configured to re-execute, responsive to retrieval of the updated real-time network state information, at least one of the distributed UAV control models, at least one updated distributed UAV control model, or a combination thereof. The features of the system can also include wherein the each of the plurality of UAVs is further configured to change, responsive to the execution of the distributed UAV control models or updated distributed UAV control models, a current operating condition of at least one of the plurality of UAVs.

DETAILED DESCRIPTION OF THE INVENTION

Figure 1:
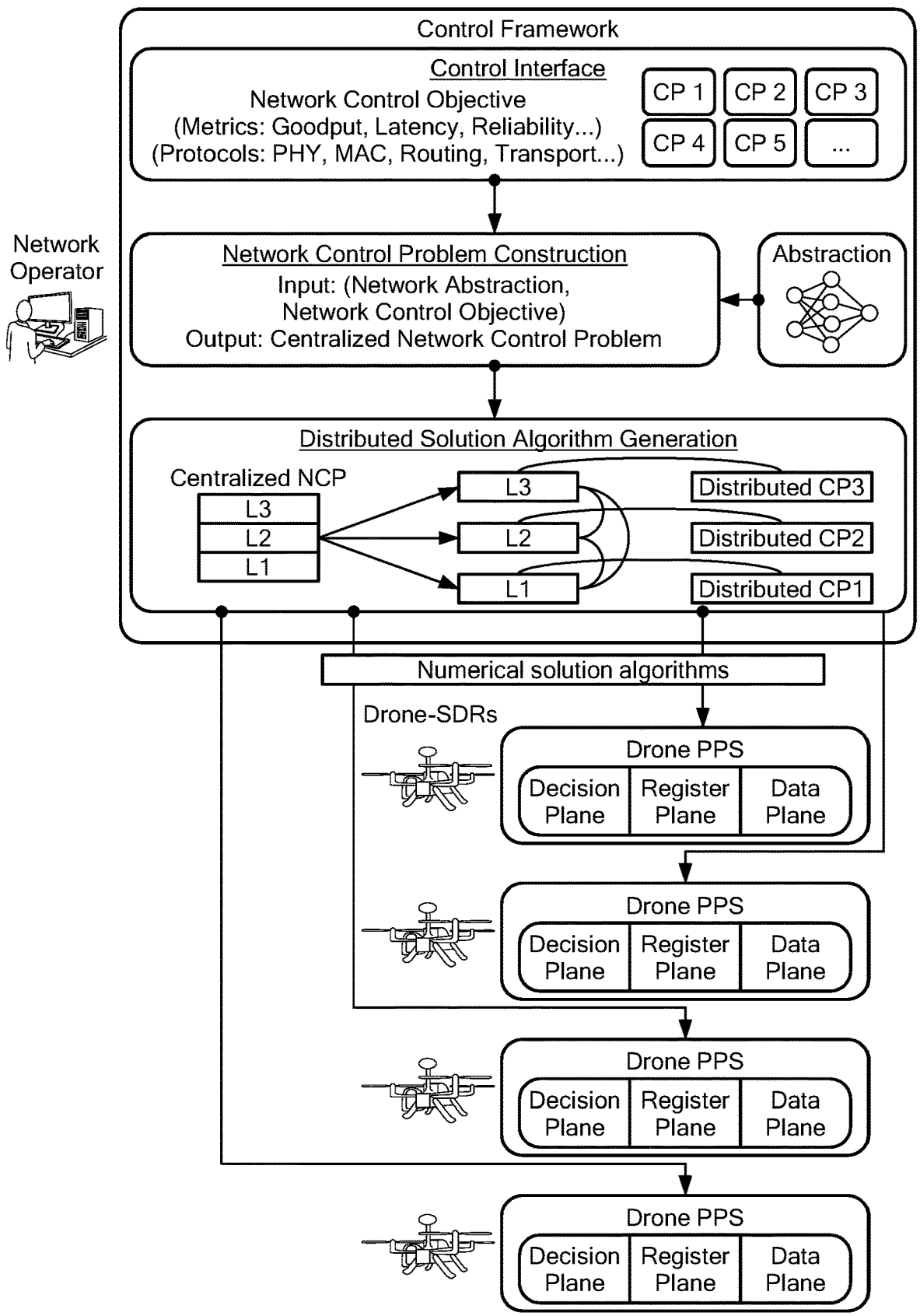
FIG. 1 is a block diagram illustrating a UAV swarm control architecture including a control framework and a plurality of UAVs, each operating a Drone Programmable Protocol Stack (DPPS) for controlling a UAV swarm network in accordance with various embodiments.

Provided herein are systems and methods for automated control (hereinafter "SwarmControl") of distributed UAV swarm-based wireless networks. Such systems and methods use automatic decomposition theories and distributed network control principles to provide the Network Operator (NO) with a unified control input for both the networking and flight control functionalities to establish a network control framework. The systems and methods described herein therefore provide the NO with the ability to define and implement complex network control problems by specifying high-level control directives for the UAV networks at a centralized terminal. In general, the control framework (i) constructs a network control problem representation of the directives of the NO; (ii) decomposes it into a set of distributed sub-models; and (iii) automatically generates distributed UAV control models to be executed at individual UAVs.

In some instances, the flexibility of software-defined radio (SDR) can be employed to implement the control framework. In such instances, the systems and methods described herein can provide an SDR-based, fully reconfigurable UAV network platform for implementing the control framework. The technology provides a unified control input for directing the motion and networking functionalities of UAV swarm wireless networks, a unified control framework for both networking and flight control, a self-organizing and self-optimizing UAV swarm network, and distributed drone network control. Furthermore, in some embodiments, SwarmControl can operate on SDR front-ends that provide the programmability and the re-configurability necessary to support UAVs in dynamic, time-varying, and potentially adversarial environments.

More generally, by providing both a unified control input and a unified control framework, the methods and systems provided herein can be used by a network operator to define the desired network behavior through a few lines of code and without any required knowledge of the low-layer network details, network protocol infrastructure, or the distributed control problem implementation. Thus, the systems and methods provided herein provide distributed network control capabilities to non-technical network operators. Accordingly, the network operator (NO) can program the overall network behavior without a-priori knowledge of the network topology, UAVs mobility patterns, and the details of the distributed control implementation. Moreover, SwarmControl implements a self-organizing and coordinated UAV network that dynamically adapts to location and network state changes, and ultimately guarantees reliable communication and connectivity with minimal human intervention. Thereby, SwarmControl can jointly and seamlessly control networking and motion functionalities for UAV networks.

As described in greater detail below, the effectiveness and flexibility of the systems and methods describe herein have been assessed with extensive flight experiments. Those experimental results show that the systems and methods provided herein facilitate fast, automated network reconfiguration. Moreover, such systems and methods can achieve an average throughput gain of 159% compared to existing solutions.

UAVs and UAV swarms are likely to become increasingly useful for future wireless applications. In particular, characteristics such as fast deployment, high mobility, improved processing capabilities, and reduced size are all beneficial for numerous wireless applications, including, for example, increasing network coverage, providing advanced network services such as location-aware content, and massive MIMO transmissions. Drone-aided wireless networks are also deployable to mitigate or overcome the inflexibility and deployment costs of ground infrastructure, resulting in significant financial advantage. Furthermore, it will be apparent in view of this disclosure that, in addition to UAV swarm networks, the systems and methods described herein can also be used in connection with 5G new radio, the Internet of Things, or any other network including mobile wireless nodes.

System Architecture

Referring now to FIG. 1, the system for controlling an unmanned aerial vehicle (UAV) swarm network includes a network operator terminal having a control framework operating thereon and a plurality of UAVs ("drones"), each having a software-defined radio ("SDR") and a drone programmable protocol stack ("DPPS") operating thereon.

The control framework is configured to receive network operator input prescribing network control directives or objectives at a control interface. The control framework then proceeds to first construct a centralized network control problem based on the desired behavior and then decompose it into independent sub-models to be solved and executed distributively at each individual UAV.

As illustrated in FIG. 1, the control framework also includes a network control problem ("NCP") (also referred to as "network control model") construction component for constructing a mathematical representation of the directives of the network operator and a distributed solutions component for decomposing the NCP into a set of independent sub-models and distributing them to individual UAVs.

The interaction with the network operator is implemented through the control interface. Through a few input characters on the control interface, the network operator can specify the desired network behavior, the network protocols to implement, and node-specific constraints. Examples of high-level directives include boosting network performance by maximizing the network throughput, prolonging UAV network lifetime by minimizing energy consumption, ensuring QoS requirements by specifying minimal rate constraints, and covering a particular aerial space, among others. The control interface also provides the network operator with an "abstraction" of the UAV network hiding the low-layer network functionalities and details of the underlying network architecture such as the number of UAVs as well as their computing capabilities and battery level, among others. As used herein, "abstraction" refers to a generalized, unified representation of various wireless performance, UAV, and other network characteristics. That is, the control interface provides the unified representation to the operator in order to inform the network control directives.

In some embodiments, the Network Operator (NO) can specify the desired network behaviors through a graphical control interface that can include, for example, a set of high-level APIs and protocol libraries. In such embodiments the NO can select among a list of predefined network control templates or custom design its own optimization problems through the provided APIs. Thus, controlling a UAV network becomes as simple as choosing among pre-defined control templates, selecting the preferred network protocols, and specifying individual-node constraints. For example, in some embodiments, the NO may express directives defining: (i) the objective function (e.g., maximize the network throughput, minimize network power consumption); (ii) which layers of the protocol stack to involve in the optimization process (e.g., the NO might want to use a standard MAC protocol version but is willing to optimize motion, routing and transmission power strategies); and (iii) node-specific constraints and QoS requirements (e.g., UAV maximum transmission power, flight speed, ground distance, transmission rate, or a combination of them).

Once the network control problem has been defined, the NCP construction component transforms the network operator's directives and requirements into a set of mathematical expressions, which are then merged and rearranged into a network control problem (NCP). The resulting NCP is a centralized representation of the high-level network behaviors defined by the network operator through the Control Interface spanning both the networking and the flight control domains, involving multiple nodes and all layers of the protocol stack. That is, the NCP construction component transforms the high-level control directives expressed by the NO and the network abstraction into a corresponding mathematical network control problem (NCP), which includes variables that span both the networking (e.g., transmission power, routing policies, session rates) and flight control (e.g., mobility patterns, ground distance, flight speed) domains.

The formulated NCP cannot be solved at individual network nodes because of the inherent coupling among optimization variables, which instead would require a centralized controller to solve. For example, in a UAV network, the end-to-end session rate is a direct function of the link capacities along the route, which change with the UAV swarm's mobility patterns and their transmission power. That is, the cross-layer nature of the NCP obtained through the Network Control Problem Construction and the coupling among its variables make it hard to compute a desirable solution in a distributed manner. To address this challenge, SwarmControl employs horizontal and vertical decomposition theories to decouple the NCP with cross-layer and cross-node dependencies into a set of distributed sub-models, each involving only a single network node and a single layer of the protocol stack. For each of the resulting sub-models, SwarmControl generates in an automated manner a distributed UAV control model, which is then forwarded to individual drones and executed at network run time based on local network state information, as further discussed below.

Still referring to FIG. 1, the distributed solution component addresses the central control challenge by at least partially "decomposing" or "loosening" the coupling among variables in the NCP. In particular, the NCP can apply a series of decomposition tools to "loosen" the coupling among variables. The outcome of this procedure is a set of independent sub-models that can be solved at each individual network node by exchanging local information only with the neighboring UAVs (e.g., computed optimal solutions, penalization terms).

The generation of distributed solutions can be performed via three fundamental steps, including (i) parsing the NCP, (ii) decomposing the NCP into sub-models, and (iii) translating each sub-model into Distributed UAV control models for distribution to the individual nodes.

First, the distributed solution component parses the objective function and the constraints of the constructed NCP and detects the optimization variables and parameters involved in the control problem. In doing so, it assigns the detected variables to specific protocol layer functionalities to be optimized by the NCP (e.g., transmission power, UAV location, routing tables). Network state parameters (e.g., channel gain coefficients, background noise) and variables assigned to functionalities excluded from the NCP optimization objective are treated as constant parameters of the problem.

Next, the distributed solution component loosens the coupling between optimization variables of the NCP. To do so, the distributed solution component identifies which network nodes and network layers have control over specific optimization variables, and generates an abstract representation of the network. Specifically, the distributed solution component generates a layered coupling graph G=E, V spanning all protocol stack layers (i.e., flight control, physical, MAC, network, transport). In this representation, vertexes V are optimization variables of the NCP and are associated to a specific layer and a specific node (e.g., transmission power belongs to the physical layer); while edges E are coupling relationships between variables of the problem. A portion of the layered coupling graph for a small UAV network is illustrated in FIG. 2B, discussed with greater detail below. The layered coupling graph permits classification of dependencies into horizontal (i.e., among variables controlled by different UAVs) and vertical (i.e., among variables controlled by the same UAV but belonging to different layers) couplings.

Based on this representation of the NCP, the distributed solution component uses tools such as Decomposition by Partial Linearization and Lagrangian Duality to relax the coupling among variables into cross-layer penalization terms. The decomposition process produces a separable-variable version of the NCP that can be decomposed into independent sub-models, each involving a specific protocol stack variable (e.g., TCP window size, location, transmission power) and a single network node only. This allows solving the resulting sub-models at each individual drone, thus obtaining a behavior conforming to the directives specified by the network operator through distributed control actions.

The final step is the generation and distribution of the distributed UAV control models to each node. For each of the decomposed sub-models, an algorithm (e.g. sequential quadratic programming) is automatically generated to calculate the numerical solution associated to a given network control variable. Each algorithm is then incorporated into an executable script model where variables and parameters appear as keywords in text format. All keywords used in by the control framework are stored in a dedicated library installed at all network nodes. Nodes can employ the library to interpret keywords (e.g., whether a specific keyword is a variable to be optimized, a network parameter or a penalization term) and replace them with real-time numerical values (if parameters) or computed numerical solutions (if optimization variables). When the keyword replacement process is over, each node is configured to execute the received scripts and compute optimized numerical solutions for the networking and flight control functionalities. When needed by the model, each node also exchanges penalization parameters and computed solutions with other nodes in close proximity.

Example of UAV Network NCP Decomposition

Figure 2A:
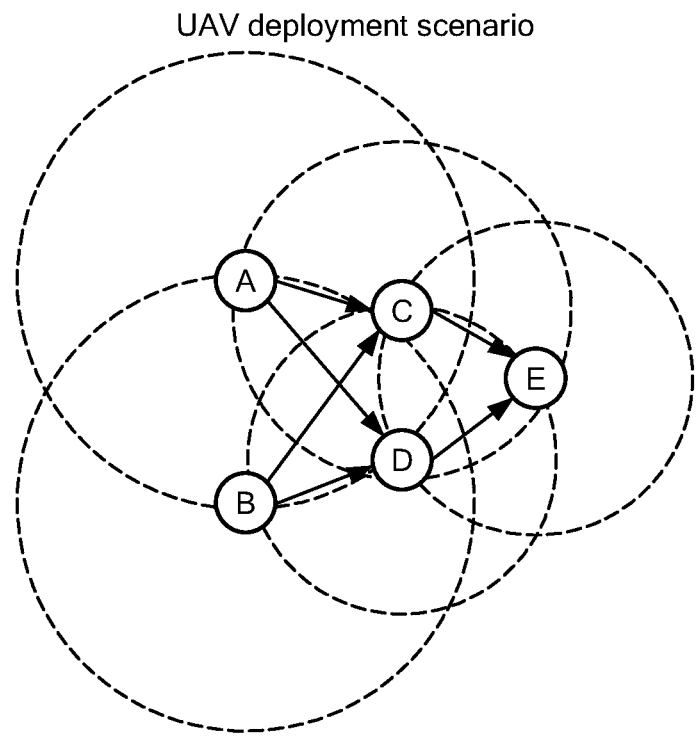
FIG. 2A is a schematic diagram illustrating an example UAV deployment scenario and resultant network coverage in accordance with various embodiments.
Figure 2B:
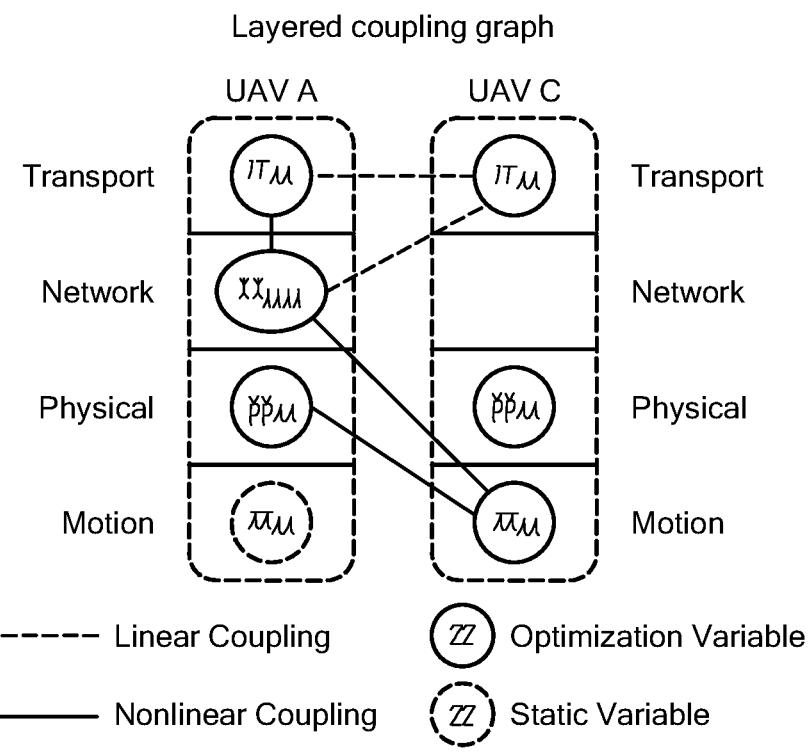
FIG. 2B is a layered coupling graph illustrating the horizontal and vertical couplings between two UAV nodes of the deployment scenario of FIG. 2A.

FIG. 2A illustrates a simple exemplary network scenario of five UAV nodes where two source nodes, A and B, transmit toward a common destination E via relay nodes C and D. Let $p_i$ be the transmission power of node $i \in N = \{A, B, C, D, E\}$. The transmission range of each node depends on its transmission power value. Assuming that the source nodes are not able to directly reach the destination E because of limited transmission power, based on routing polices, they independently select which relay node, C or D, to employ to forward their traffic toward the destination. Additionally, assume that the network operator (NO) defines the following high-level directive, maximize throughput), i.e., maximize the overall throughput of the network. The NO also specifies that this objective can be achieved by optimizing the transmission rate, routing tables, power allocation, and locations of the UAVs.

For illustration purposes, also assume that nodes A, B and E are in "hold mode" (i.e., they are instructed to keep their initial location unchanged), while C and D are free to move around. The impact of mobility on the relaying tasks is threefold: (1) the UAVs can move to get closer to the source and destination, and thus improve the signal-to-interference-plus-noise ratio (SINR) along the session path; (2) getting closer to other nodes might result in increased mutual interference and degrade the overall network performance; and (3) moving outside the transmission range of other UAVs may result in network partitioning.

As mentioned above SwarmControl processes the control directives of the network operator and, by relying solely on the network abstraction provided by the control framework discussed above constructs the following optimization problem:

$$\underset{r,x,p,\pi}{\text{maximize}}\ r_C + r_D, \quad (1)$$

$$\text{subject to } r_C \leq x_{AC} r_A + x_{BC} r_B, \quad (2)$$

$$r_D \leq (1 - x_{AC}) r_A + (1 - x_{BC}) r_B, \quad (3)$$

$$SINR_{AC}(p, \pi) \geq x_{kC} \gamma, \text{ for } k = A, B, \quad (4)$$

$$SINR_{kD}(p, \pi) \leq (1 - x_{kC}) \gamma, \text{ for } k = A, B, \quad (5)$$

$$SINR_{nE}(p, \pi) \geq \gamma, \text{ for } n = C, D, \quad (6)$$

where $r=(r_A, r_B, r_C, r_D)$, $x=(x_{AC}, x_{SC})$, $p=(p_A, p_B, p_C, p_D)$, $\pi=(\pi_C, \pi_D)$; $\gamma$ represents the minimum SINR level to correctly decode received messages; and $SINR_{kn}(p, \pi)$ represents the SINR experienced by node n when receiving useful signals from node k. For example, if k=A and n=C, $SINR_{kn}(p, \pi)$ is defined as $$SINR_{AC}(p, \pi) = \frac{G(\pi A, \pi C) pA}{N + G(\pi, \pi p) BC},$$

with N being the ambient noise power and $G(\pi k, \pi n)$ being the channel coefficient between two nodes k and n. In this example, we assume that all nodes are in line-of-sight conditions and $G(\pi k, \pi n)$ can therefore be computed through the free-space path loss model. Specifically, we have $G(\pi k, \pi n) = M d^{-\eta}$, where M is a positive constant, 17 represents the path-loss coefficient, and (d, $\pi k$, $\pi n$), is the distance between position $\pi k$ and $\pi n$.

It will be apparent in view of this disclosure that the exemplary problem presented herein is simplified for clarity but that, in general, the system will likely receive more network objectives from the network operator and generate NCPs having larger numbers of constraints to ensure the feasibility of the NCP. Among others, the system includes a capacity constraint such that the transmission rate $r_i$ does not exceed the link capacity. For the sake of illustration, these and other constraints have been omitted from Problem (1)-(6). Nevertheless, any such NCP will generally be decomposed and treated as described below.

Based on the constructed centralized NCP, the decomposition process starts. First, the distribution solution component detects optimization variables and classifies their coupling with the aid of the layered coupling graph (e.g. as partially illustrated in FIG. 2B). A portion of the layered coupling graph generated by the system for this specific example scenario is illustrated in FIG. 2. For example, in the transport layer the transmission rate variables $r_A$ and $r_C$ are coupled through the link rate constraint (2). Similarly, physical layer variable $p_A$ at node A and the motion layer variables $\pi_{AC}$ at node C are coupled through the physical link capacity constraint expressed in (4).

Among others, from (2) we have that variables $r_C$ and $r_A$ in (2) are coupled together through a linear relationship (dashed lines), which can be removed in this case by using the concept of functions with separable variables. On the contrary, $r_A$ and $x_{AC}$ are coupled through a stronger nonlinear relationship, which requires more complex decomposition tools such as partial linearization, Taylor series linearization, and Lagrangian duality.

Now we explain the decomposition process taking constraint (4) with k=A as an example, while the remaining expressions in Problem (1)-(6) can be decomposed similarly. First, Constraint (4) can be rewritten as $$\Theta(\pi_C, p_A, x_{AC}, p_B) = G(\pi_A, \pi_C) p_A - x_{AC} \gamma N - x_{AC} \gamma G(\pi_B, \pi_C)$$
$$p_B \geq 0 \quad (7)$$

where the optimization variables are $r_C$, $p_A$, $x_{AC}$ and $p_B$. Optimization variables at different UAVs and at different layers of the protocol stack are coupled together by the nonlinear relationships in (7). It is well known that any function f(x, y) can be linearized by using a first-order Taylor expansion at any point (a, b) as $$f(x, y) \approx f(a, b) + \frac{\partial f(x, y)}{\partial x}\bigg|_{a,b}(x-a) + \frac{\partial f(x, y)}{\partial y}\bigg|_{a,b}(y-b) \quad (8)$$

By applying the same principles shown in (8) to (7), first a linearized constraint is generated, and then Lagrangian duality is used to include the linearized constraint into the objective function of Problem (1)-(6). $\Theta^{\sim}(\pi_C, p_A, x_{AC}, p_B)$ being the linearized version of (7), we can generate the following Lagrangian dual function $$L = r_C + r_D + \lambda_A \Theta^{\sim}(\pi_C, p_A, x_{AC}, p_S) \quad (9)$$

where $\lambda \Theta^{\sim}$ is the Lagrangian multiplier associated to the linearized constraint (4). It can be noted that the dual function L in (9), is now formulated with separable variables with respect to ($r_C$, $r_D$, $\pi_C$, $p_A$, $x_{AC}$, $p_B$), with only $\lambda_A$ keeping track of the previous coupling.

Accordingly, by extending the above decomposition procedures to the whole NCP (1)-(6), and by letting UAVs iteratively calculate and distributively exchange the Lagrangian multipliers with their neighbors, we can decouple the whole problem into multiple independent sub-models. The obtained sub-models are then solved through distributed UAV control models, where the optimization variables and network parameters are represented through keywords.

To clarify the use of keywords in the system, let us consider the term G ($\pi k$, $\pi n$)$p_k$ at the numerator of the SINR expression previously defined. In the distributed scripts, this term is transformed into the string: CCGAINDEST txpower. Network nodes access the library looking for instructions on how to interpret each keyword. In this case, CCGAINDEST is the string representing the channel gain coefficient with the next hop, which is thus replaced with its real-time value measured by drone programmable protocol stack. Similarly, the library also specifies that txpower is a keyword representing an optimization variable, i.e., the transmission power, and it is thus used as an input of the optimization solver.

As discussed above, the generated models will then be distributed to and executed at each network node, with the computed numerical solution implemented in the Drone PPS.

Figure 3:
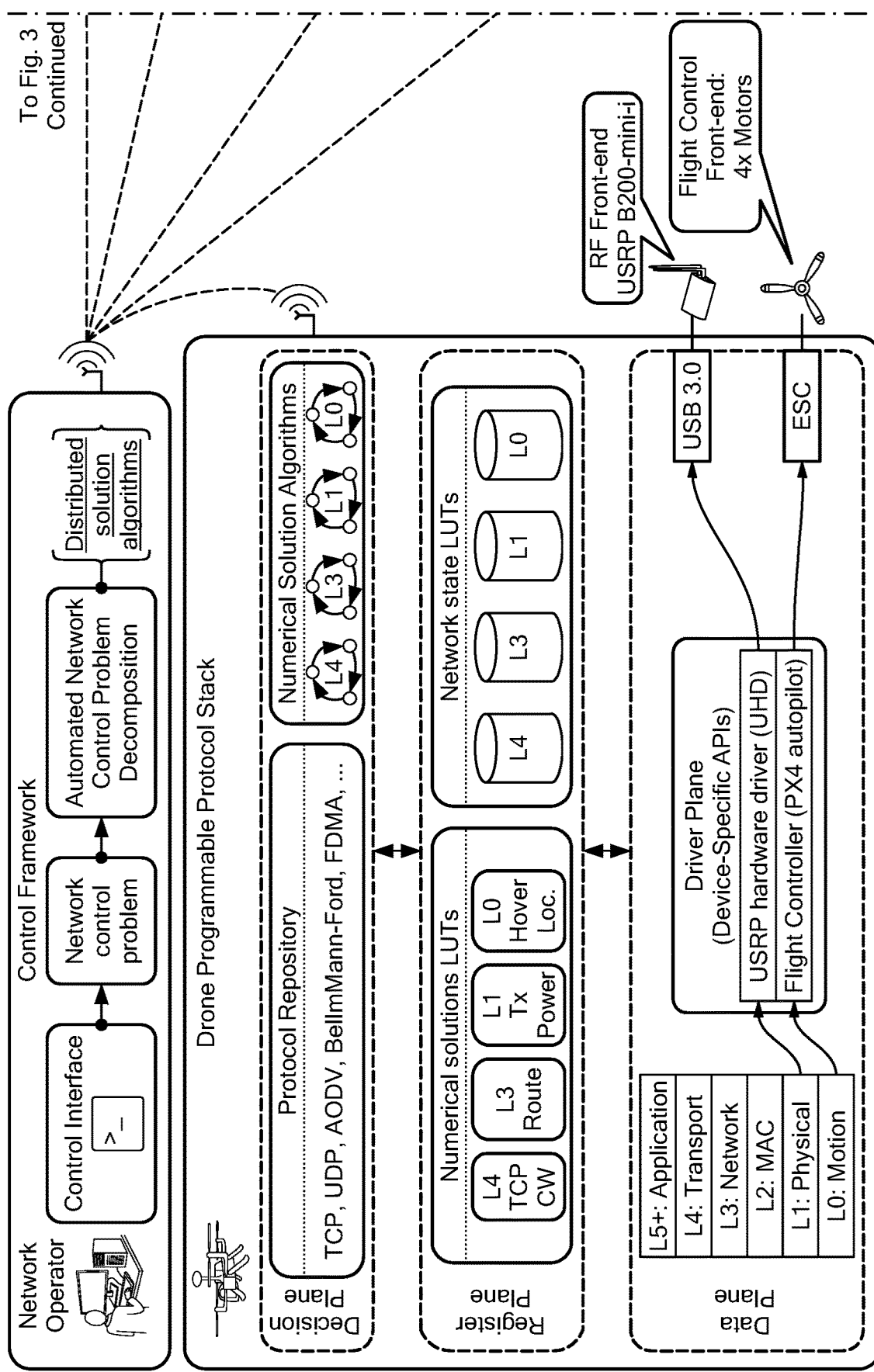
FIG. 3 is a block diagram illustrating the UAV swarm control architecture of FIG. 1 and showing additional DPPS detail in accordance with various embodiments.
Figure 3:
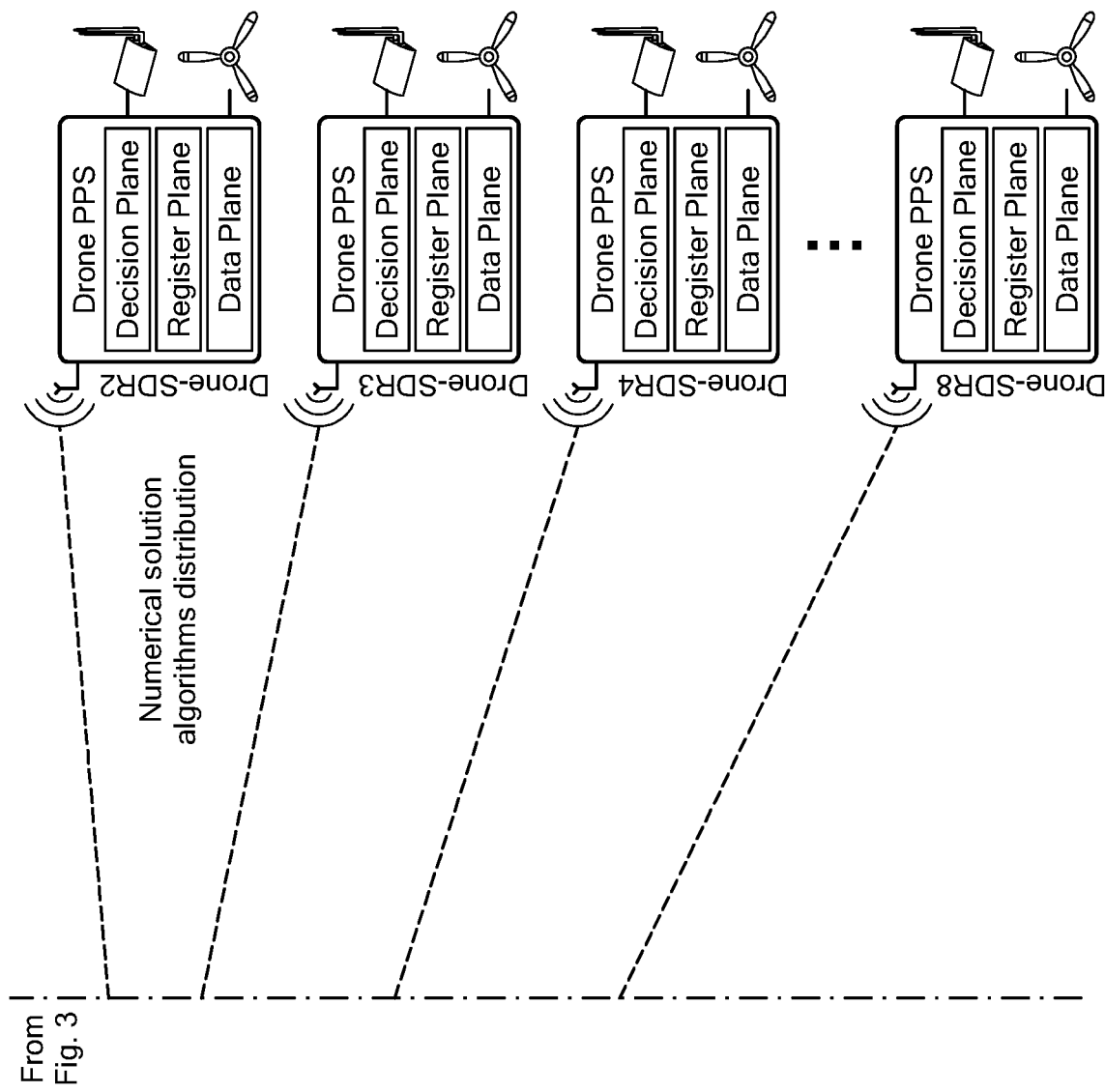

Referring now to FIG. 3, the DPPS is configured to span all layers of the network protocol stack as well as the flight control functionalities. The DPPS is based on SDN principles and follows a three-plane structure: (i) decision plane, (ii) register plane, and (iii) data plane. The DPPS executes the distributed UAV control models generated by the SwarmControl framework and enforces the networking and motion strategies on each UAV.

Drone Programmable Protocol Stack (DPPS)

As discussed above, the systems and methods described herein provide automated and distributed control of UAVs' networking and flight control functionalities. To compute a desirable network operating point, it is crucial for individual UAV nodes to execute the distributed UAV control models generated by the Control Framework with up-to-date and accurate information about network state and UAVs location. At the same time, it is equally important to make the computed numerical solutions ready to be implemented at the network protocol stack and at the flight controller. In the exemplary SwarmControl system this is accomplished by a Drone Programmable Protocol Stack (DPPS) based on three tightly interacting planes, namely Decision Plane, Register Plane, and Data Plane. The design architecture of the three planes is illustrated in FIGS. 1 & 3. Referring now to FIGS. 1 & 3, the Drone PPS is installed at each individual UAV to execute and solve the Distributed UAV control models received from the Control Framework in a distributed and automated fashion. The DPPS spans all layers of the network protocol stack and tightly interacts with the flight controller firmware. The DPPS provides the building blocks and primitives necessary to prototype complex cross-layer and cross-domain network protocols, allowing complete control of the network, sensing and motion parameters at all layers of the protocol stack. In some embodiments, the DPPS includes three distinct components, namely, Decision Plane, Data Plane, and Register Plane.

The Decision Plane, upon receiving the models generated by the Control Framework, executes them to compute a numerical solution based on the most recent network state (e.g., the locations of the UAVs, signal-to-noise-ratio (SNR), routing tables). This information can be retrieved from the Register Plane as described in further detail below.

The Data Plane is responsible for implementing the networking and motion functionalities by reconfiguring the networking and motion operating parameters based on the optimized solution computed by the Decision Plane. For this purpose, the Data Plane implements a network protocol stack and interfaces it with the radio front-end as well as the flight control front-end. The Data Plane has continuous access to real-time network state information such as SNR, queue status, battery level, and ground distance.

The Register Plane acts as the bridge between the above two planes, as illustrated in FIGS. 1 & 3, allowing the Decision Plane to retrieve the most recent network state information from the Data Plane while making the network operating parameters optimized by the Decision Plane accessible to the Data Plane. For example, the optimization results of the Decision Plane about, e.g., TCP congestion window, routing path, transmission power, modulation scheme and the flight of the UAVs, are first stored in the Register Plane and then read and implemented by the Data Plane to enforce the new networking and motion strategies.

SwarmControl DPPS receives the distributed UAV control models (e.g., motion control model, transport rate control model) to be executed at individual UAVs and runs them at its Decision Plane as shown in FIG. 3. This plane features a Protocol Repository containing the software implementations of different network protocols and motion strategies (e.g., TCP, Bellman-Ford routing model), together with the mathematical solvers to run the dispatched scripts. The Decision Plane is in charge of running the distributed optimization models in real-time, using up-to-date network state and motion information as input parameters (e.g., noise power, queue status, distance from other UAVs). Such information is retrieved from the Register Plane, which is also employed to store the computed numerical solutions.

The Drone PPS configures at run-time the networking and flight control operating parameters contained in the Data Plane based on the computed numerical solutions (e.g., change the current UAV location based on the optimized routing table, configure the TCP window size based on the optimized application-layer rate injected into the network). This plane implements a fully-programmable re-configurable protocol stack spanning all the networking layers and motion layers, and interfaces with the radio and motion front-end through the SDR and the flight controller drivers as illustrated in the lower part of FIG. 3. The Data Plane has full control over both the radio front-end, implemented by a software defined radio and the motion front-ends, as well as on protocol stack functionalities; and it is in charge of feeding actual network state and UAV location information back to the Register Plane.

As shown in FIG. 3, both the network state information and the computed numerical solutions are stored in dedicated look up tables (LUTs) in the Register Plane. Each Drone PPS layer has a dedicated Network State LUT in the Register Plane, where to store all the layer-related network state parameters (e.g. SINR and link capacity in physical layer L1 LUT; set of neighbors and their distance in network layer L3 LUT; physical location and obstacles vicinity in motion layer L0 LUT). Numerical solutions are stored in a similar way in dedicated Numerical Solution LUTs, one per DPPS layer (e.g., TCP window size in transport layer L4 LUT; routing tables for network later L3 LUT; location for physical layer L1 LUT).

Prototyping and Assessment

SwarmControl was prototyped over Intel Aero drones interfaced with Ettus B205mini-i SDRs. Networking and motion operations are jointly controlled by the SwarmControl DPPS installed on the Intel compute board of the drone. The performance of SwarmControl was assessed on a multi-hop UAV network with eight flying drones and compared with other state-of-the-art solutions by conducting extensive experiments in a unique indoor anechoic chamber designed for testing swarms of drones. Experiments demonstrated that SwarmControl effectively improves the network performance (up to 231% of throughput gain) and dynamically adapts networking and motion strategies to different control objectives, topologies, channels, and interference conditions.

Experimental Performance Evaluation

The performance of SwarmControl was assessed by comparing it to other state-of-the-art solutions on a variety of network configurations.

Figure 4:
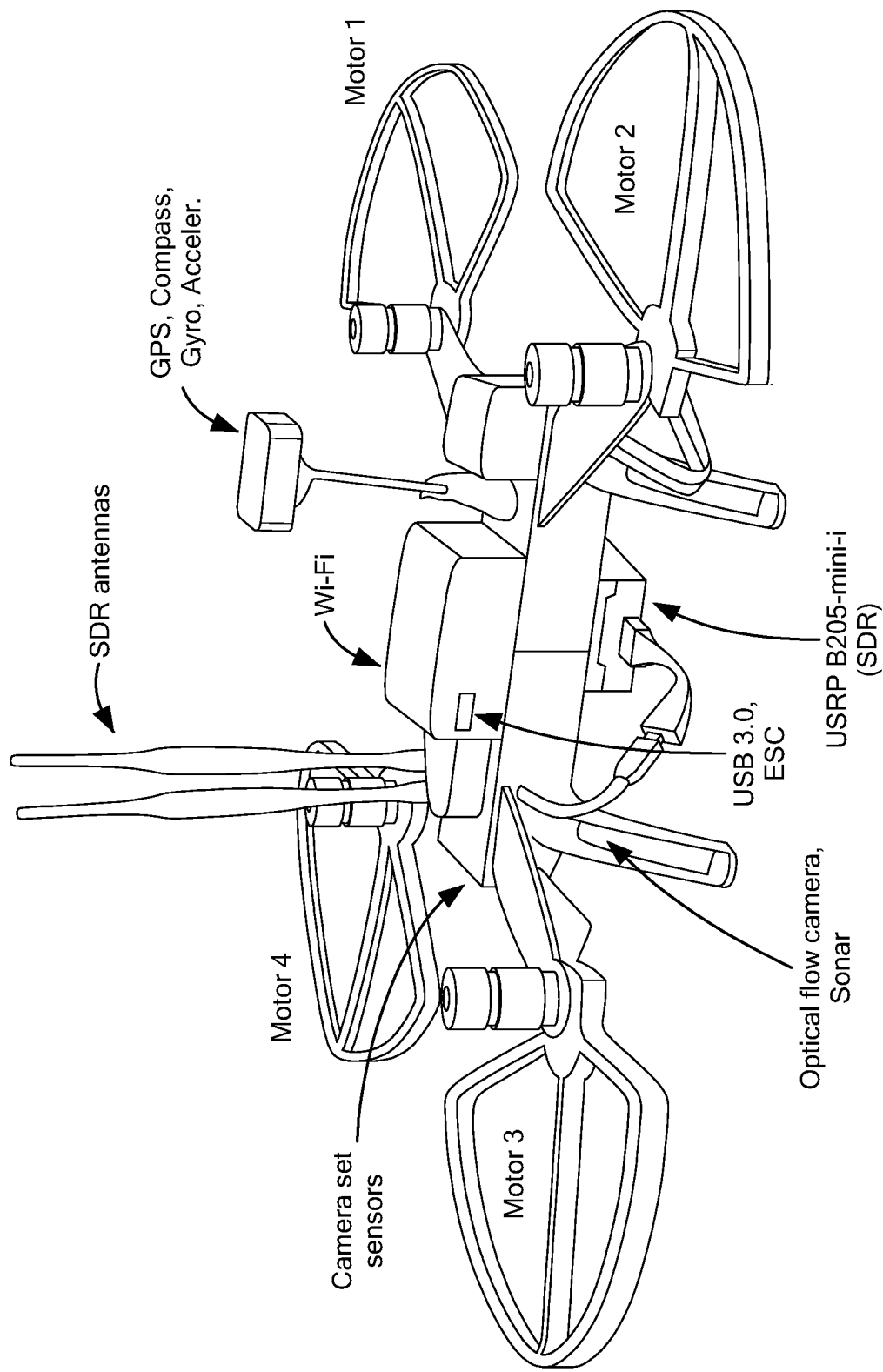
FIG. 4 is a perspective view of an exemplary wireless networking UAV in accordance with various embodiments.

The first challenge toward the evaluation of SwarmControl is the lack of commercial off-the-shelf UAV platforms featuring SDRs. To address this, we designed and built a custom UAV network node platform, referred to as Drone-SDR, by mounting an Ettus Research Universal Software Radio Peripheral (USRP) B205mini-i SDR on an Intel Aero Ready-to-Fly Drone, as illustrated in FIG. 4.

The B205mini-i SDRs were selected because they were the most compact, lightweight and low-power SDR devices available on the market. However, it will be apparent in view of this disclosure that any SDR capable of executing a particular mission profile can be used in accordance with various embodiments. The Intel Aero Ready-to-Fly Drone was selected for the SwarmControl UAV nodes because it provided a flight autonomy of over 20 minutes, a hub-to-hub diagonal length of 360 mm, a base-to-top height of 222 mm, and high portability and maneuverability. However, it will be apparent in view of this disclosure that any UAV capable of satisfying particular mission requirements can be used in accordance with various embodiments. Intel Aero houses a Compute Board providing sufficient computational power to run Ubuntu 16.04 and SDR development frameworks such as GNU Radio. Flight management, motors control, and sensors fusion are performed on a Pixhawk 4 Flight Controller Unit (FCU) directly connected to the Compute Board. All FCU parameters and commands (e.g., remote control and sensor readings) are accessed through UDP communications via the MAVLink Router.

Figure 5:
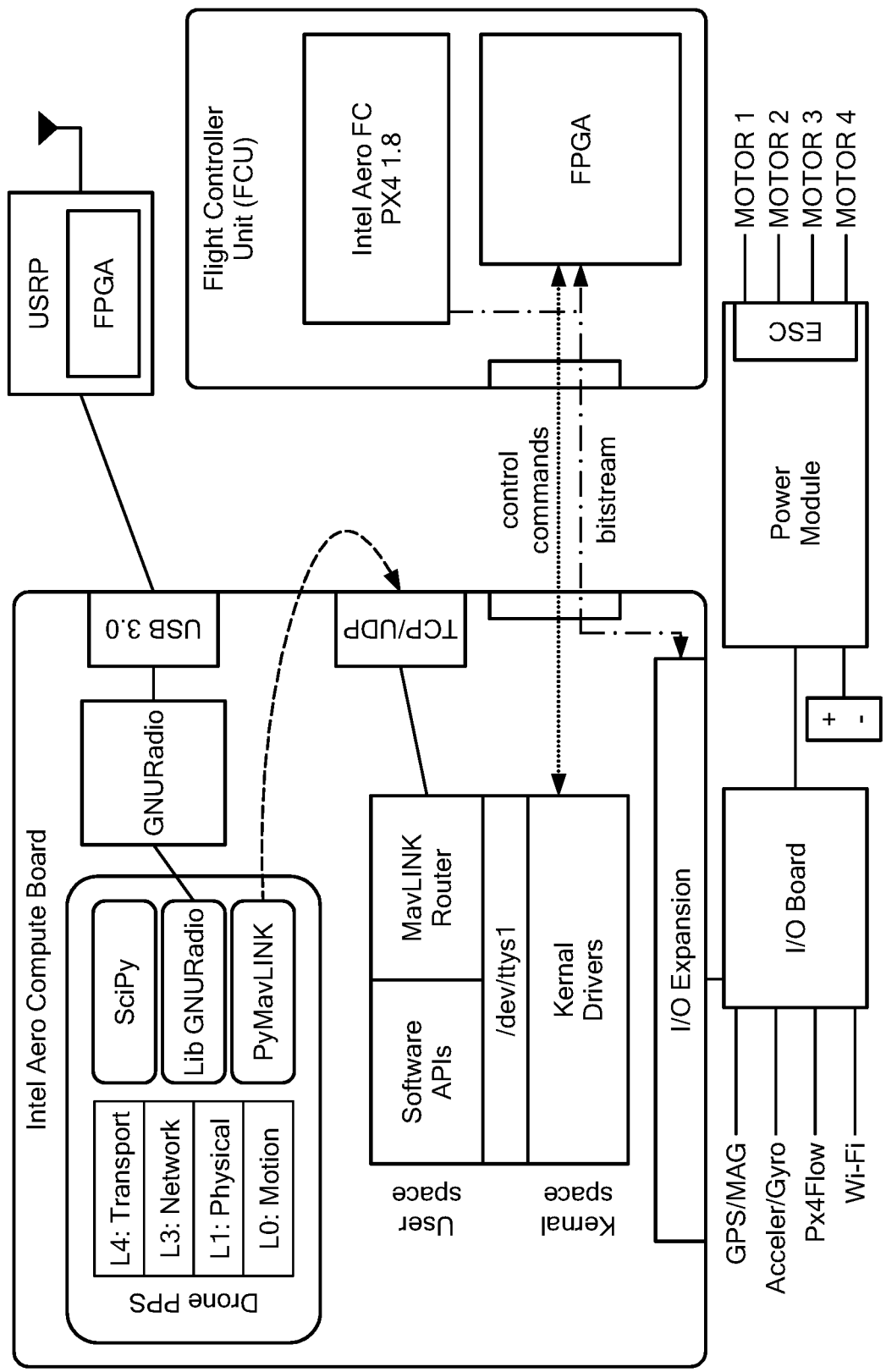
FIG. 5 is a block diagram illustrating on-board components of the exemplary wireless networking UAV of FIG. 4 in accordance with various embodiments.

Different from legacy UAVs, SwarmControl UAV nodes were provided with the DPPS Motion Layer (L0: Motion in FIG. 5). The DPPS for the prototypes hosted a Pymavlink-based control implementation, allowing each node to execute flight control operations autonomously. Furthermore, the SwarmControl prototype DPPS is entirely implemented in a high-level scripting language (i.e., Python) and runs on native Linux OS, which directly interfaces with both the FCU and GNU Radio. This makes SwarmControl compatible with every MAVLink-based programmable drone interface (e.g., Pymavlink, DroneKit). FIGS. 4 and 5 show an overview of the Drone-SDR prototype, its architecture, and its hardware design. However, it will be apparent in view of this disclosure that the DPPS and control framework can each be implemented in any suitable scripting language.

Experimental Setup

Following the illustrative diagram in FIG. 3, the network operator (NO) first defines the network behavior through the control interface. Consequently, SwarmControl constructs and decomposes network control problems and distributes the corresponding distributed UAV control models over the wireless interface to the Drone-SDR nodes of the network introduced above. Each Drone-SDR node locally solves the distributed control problems through numerical models, and enforces the obtained solutions on the motion (i.e., the UAV motors) and radio front-end (i.e., SDR); thus implementing, through distributed control actions, the overall network behavior defined by the NO.

SwarmControl was tested on a plethora of network control problems and network deployments, such as fully aerial networks, where all network nodes are UAVs, and hybrid ground/aerial networks, including both fixed ground and UAV nodes; varying the number of nodes, number of sessions, topologies, and testing environments. Given the complexity of the network control problems, we tested the effectiveness and flexibility of SwarmControl in an incremental fashion, obtaining intermediate results to highlight the impact of different features on the overall system performance. We demonstrate how SwarmControl efficiently handles cross-layer optimization by considering joint optimization operations that span across four layers of the prototyped drone programmable protocol stack (DPPS). Specifically, we optimized the transport layer transmission rate, routing decisions, transmission power, and flight control of the UAVs.

Furthermore, the performance of the UAV network was compared under four different control schemes: (i) Swarm-Control, which jointly optimizes all networking and motion layers of the DPPS; (ii) Best Response (BR), independently optimizing the parameters at different layers of the PPS with no cross-layer optimization and joint optimization of networking and flight control; (iii) No Control (NC), which does not use any network optimization mechanism and operates only with fixed networking parameters; and (iv) WNOS, jointly optimizing the transport and physical layer parameters of the DPPS only.

In all experiments, it was assumed that the NO selects TCP as the transport layer protocol, single-path routing model, a frequency division multiplexing MAC, and GMSK narrowband modulation. Furthermore, all transmissions were performed in the 2.4 GHz ISM frequency band and the bandwidth of transmitted signals was 500 kHz. In all figures, links connecting UAVs represent a single snapshot of the network state, which may evolve throughout the experiment.

Fully Aerial Network

The performance of SwarmControl was first evaluated by deploying 8 Drone-SDRs in three different scenarios, namely Scenarios 1, 2, and 3 (FIGS. 6A-C); comparing it to Best Response (BR) and No Control (NC) schemes under the Max-log-rate control problem. In these three scenarios, the mobility of Drone-SDRs was constrained to highlight the performance of SwarmControl in different network topologies. Scenarios 1 and 2 feature dense indoor environments with obstacles, non-line of sight conditions, strong multipath effect, and high background noise. On the contrary, Scenario 3 presents a large obstacle-free space with low signal refraction and negligible multipath effect. Operating on the same set of spectrum bands, the deployed Drone-SDRs mutually interfere with each other. Therefore, the overall end-to-end network throughput depends on transmission power, routing policies and TCP session rate. The experiment includes two Drone-SDR source nodes opening two sessions toward two destinations and injecting traffic over the multi-hop Drone-SDR network.

In all three considered scenarios, SwarmControl—by jointly and distributively optimizing TCP rate, routing strategies and transmission power—significantly outperforms the BR and NC schemes in terms of overall network throughput. In particular, the average performance gain of SwarmControl with respect to the second best performing scheme, as shown in FIG. 6D, is 52%, 90%, and 208% for Scenarios 1, 2, and 3, respectively.

SwarmControl makes the operation of modifying the behavior of a whole aerial network as simple as inputting a few characters into the Control Interface. With the current instance of SwarmControl, automated decomposition and re-distribution of the new optimization problems to all UAVs take less than 3 seconds, which allows modifying the network behavior in real-time.

Figure 6A:
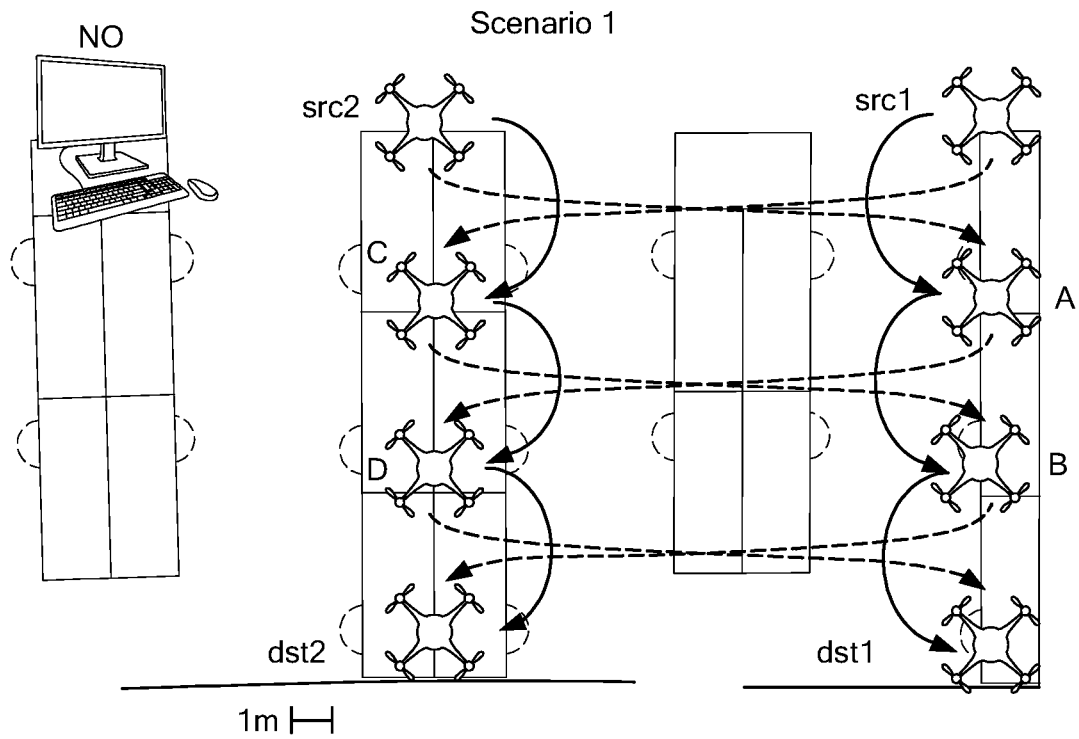
FIGS. 6A-C are schematic diagrams illustrating UAV swarm positioning configurations in accordance with various embodiments.
Figure 6B:
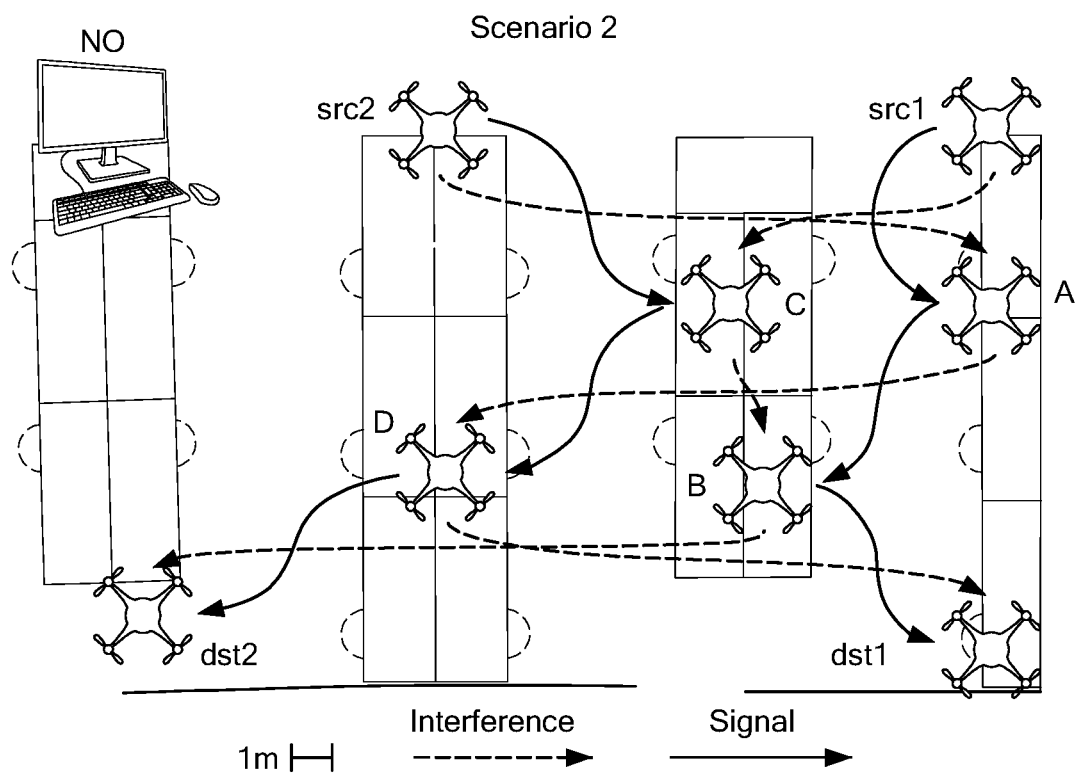
Figure 6C:
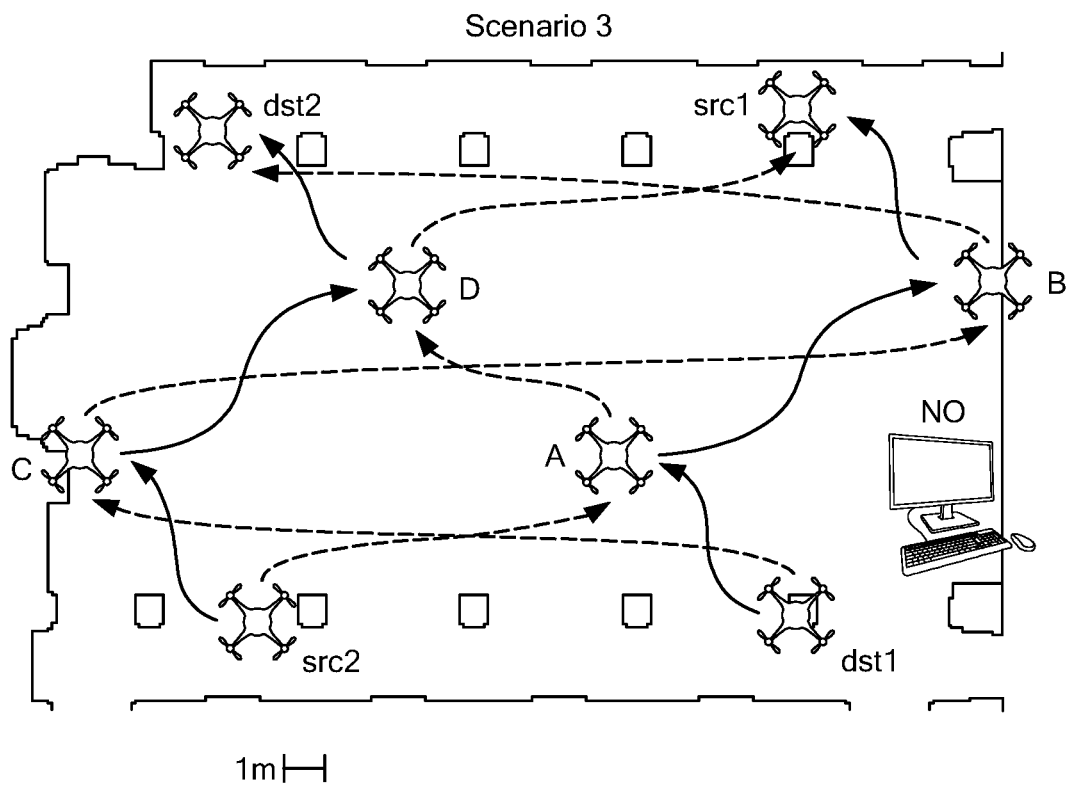
Figure 6D:
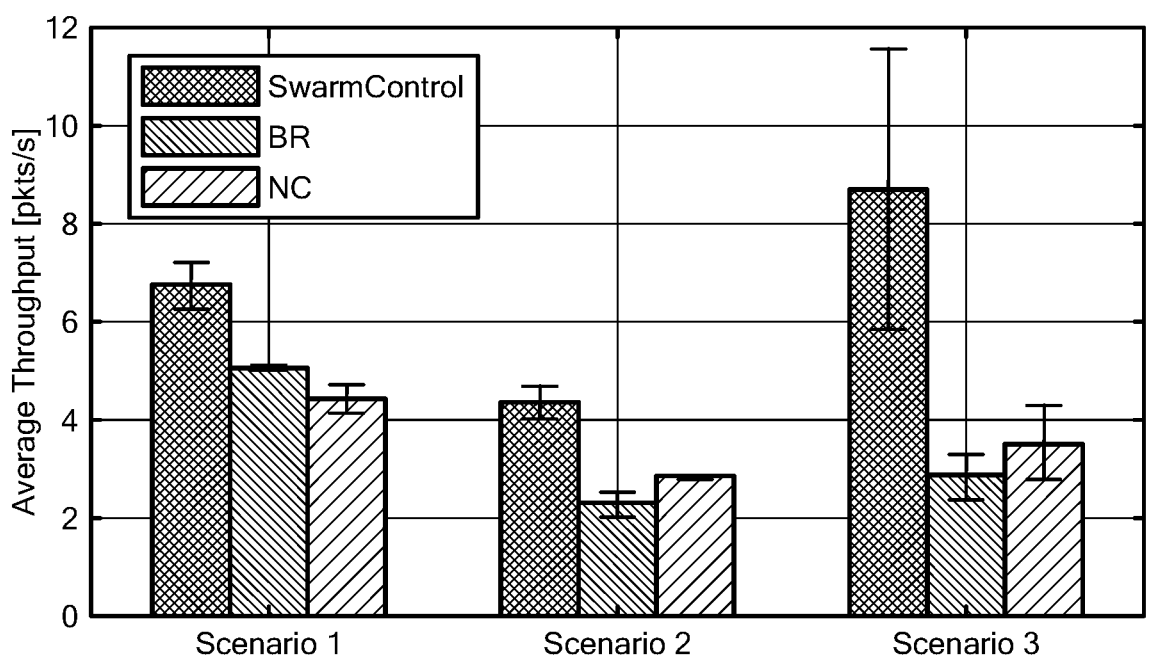
FIG. 6D is a graphical comparison of average throughput of the network using the systems and methods described herein ("SwarmControl"), a "best response" ("BR") learning model, and a No Control ("NC") baseline as applied in connection with each of the positioning configurations of FIGS. 6A-C in accordance with various embodiments.
Figure 7:
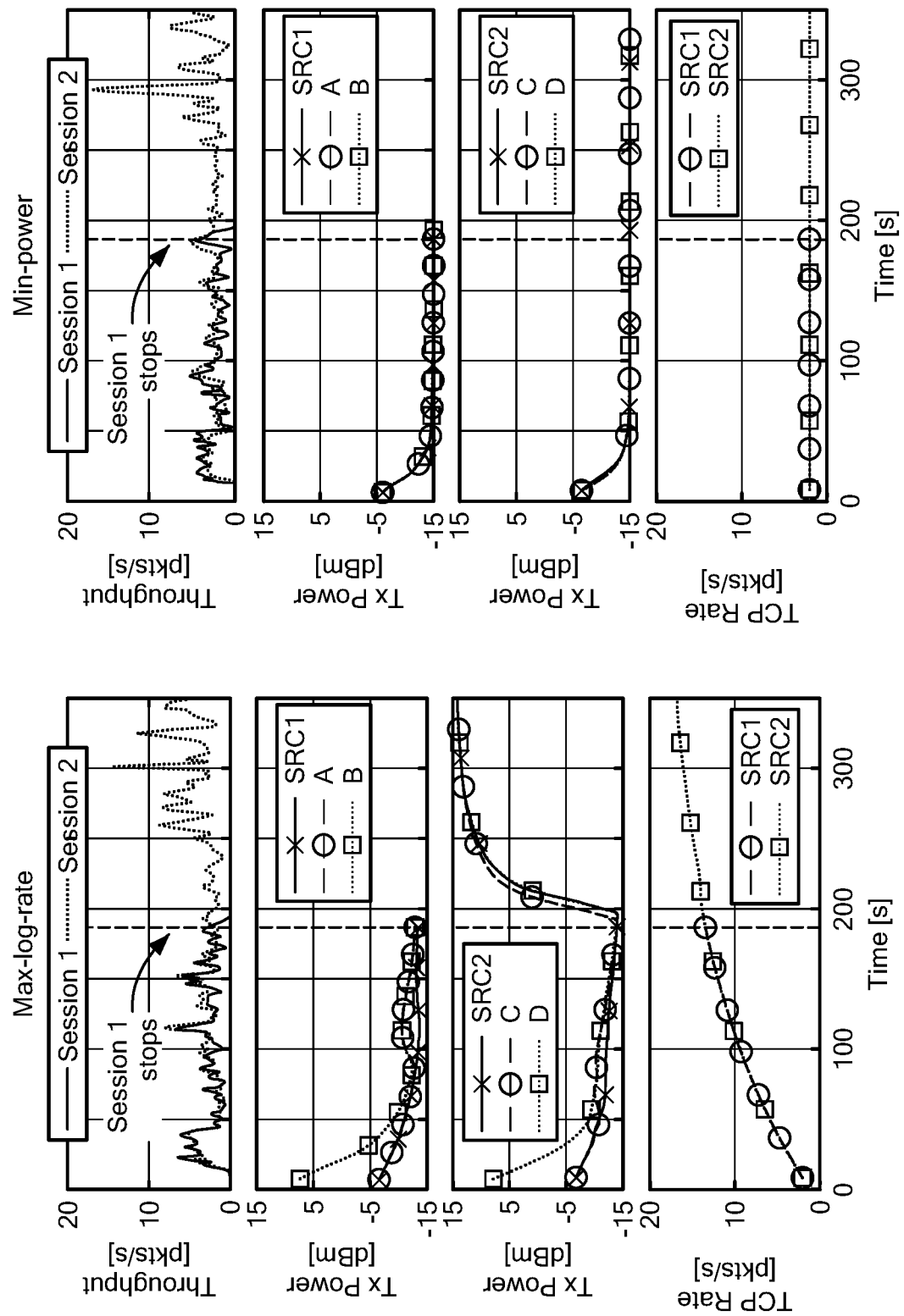
FIG. 7 is a graphical comparison between network performance using different network performance directives as applied in connection with the positioning configuration of FIG. 6A in accordance with various embodiments.

To understand how different control objectives lead to different distributed control actions in SwarmControl, in FIG. 7 optimized DPPS parameters for Max-log-rate and Min-power control are compared for Scenario 1 as depicted in FIG. 6A. Max-log-rate simultaneously maximizes fairness and overall network application throughput, while Min-power aims at minimizing the overall consumed network power while maintaining the minimum-session-rate QoS requirements. FIG. 7 shows the measured network throughput together with the physical layer transmission power levels and TCP transport rates at individual nodes for a single experiment realization under Max-log-rate and Min-power network control problems. We terminated Session 1 after 180 seconds in both experiments. Despite the fact that stopping Session 1 causes a general throughput gain at Session 2 because of the reduced interference, under the Max-log-rate control problem the nodes increase the transmission power and TCP transport rate to obtain an overall network throughput maximization. On the contrary, under the Min-power control problem, nodes belonging to Session 2 do not increase neither the transmission power nor the session rate, which results in lower power consumption, i.e., the objective of the Min-power network control problem.

Mixed Ground/Aerial Network

Figure 8A:
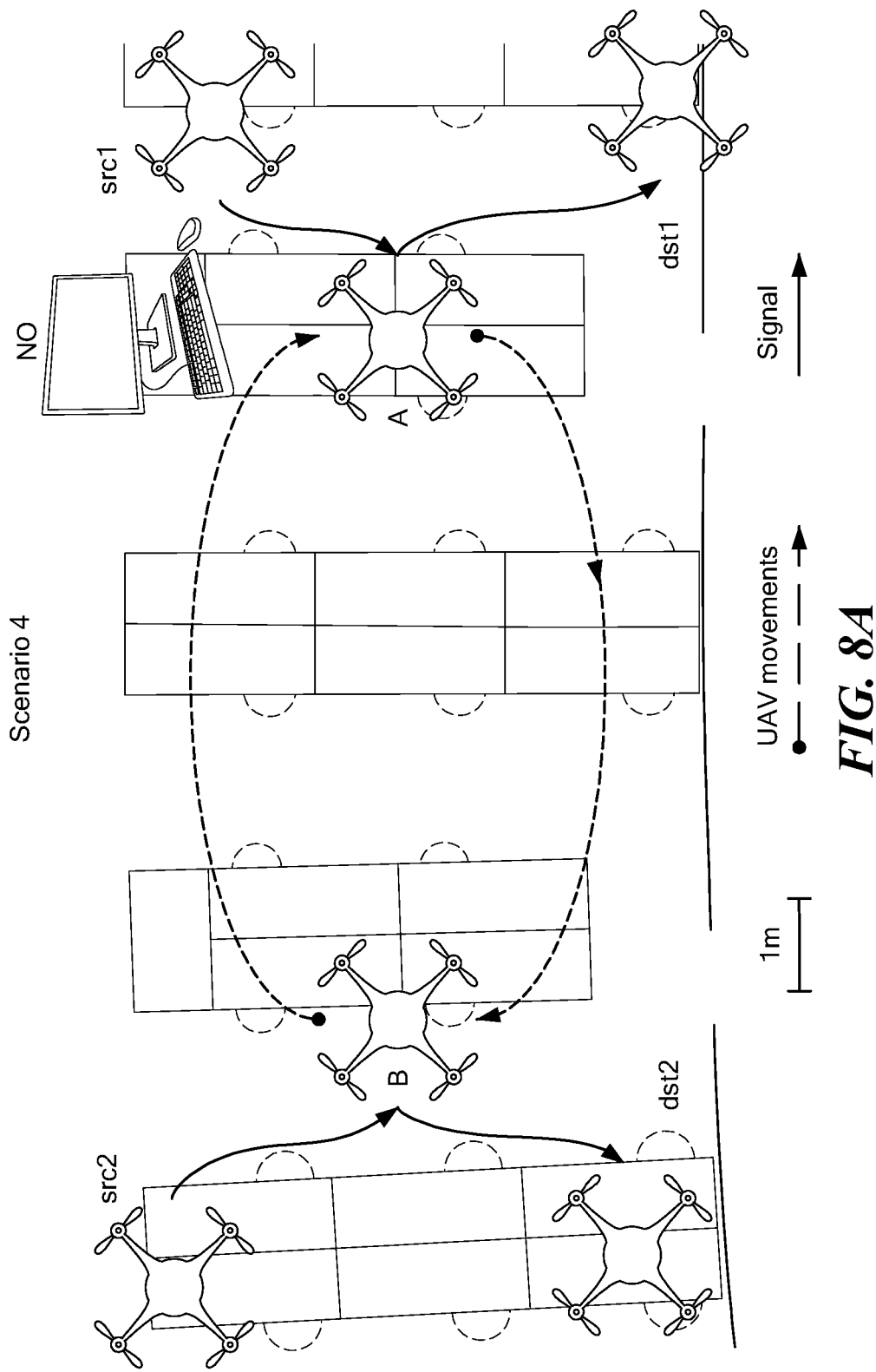
FIG. 8A is a schematic diagram illustrating another UAV swarm positioning configuration in accordance with various embodiments.

Here, a swarm of Drone-SDR nodes integrated with a ground wireless infrastructure. The mobility management capability of SwarmControl was evaluated using a swarm of 6 Drone-SDRs. As shown in Scenario 4 (FIG. 8A), two (2) Drone-SDRs switched their locations every 60 seconds, for a total of 3 times during each experiment, while an additional 4 Drone-SDRs had fixed locations. Specifically, the throughput performance of location-aware SwarmControl providing joint optimization of routing, transmission power, and TCP transport rate was investigated and compared to a location-oblivious Best Response (BR) scheme under the Max-log-rate control problem.

Figure 8B:
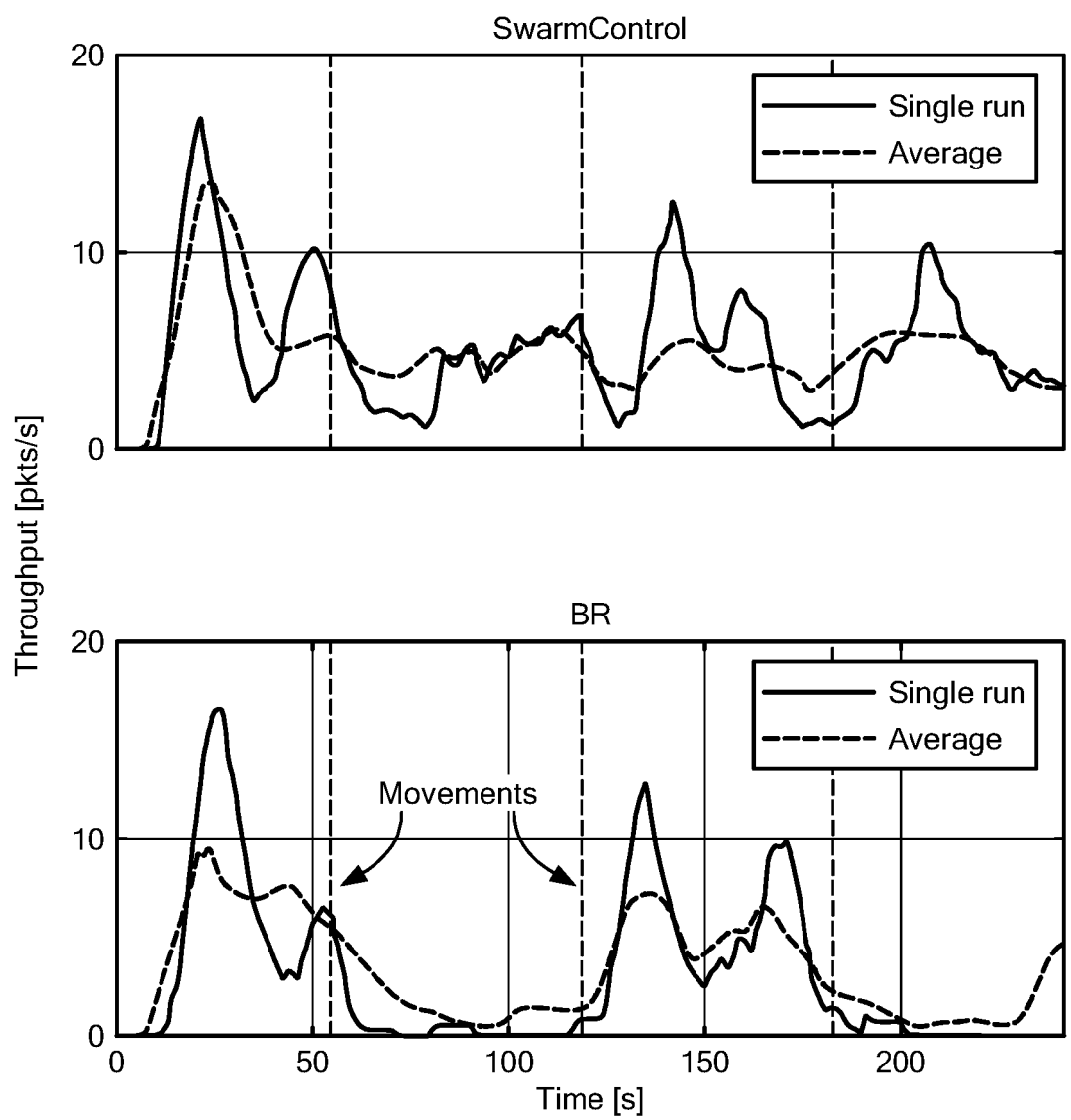
FIG. 8B is a graphical comparison of average throughput of the network between the systems and methods described herein ("SwarmControl") and a best response ("BR") learning algorithm as applied in connection with the positioning configuration of FIG. 8A in accordance with various embodiments.

As illustrated in FIG. 8B, SwarmControl outperformed the BR scheme. Particularly, SwarmControl achieved higher throughput than BR in the 60s 120s and 180s 240s intervals, where Drone-SDRs move and change the initial topology, by rapidly and optimally adapting networking parameters to new network topology and channel conditions.

Network Failure Recovery and Offloading

In the context of supplementing, augmenting, or repairing ground infrastructure, experiments were run showcasing the use of SwarmControl for network failure recovery (see FIGS. 9A & 9B) and offloading for the ground infrastructure (see FIGS. 10A & 10B), each deployed to improve the connectivity and overall network performance.

Figure 9B:
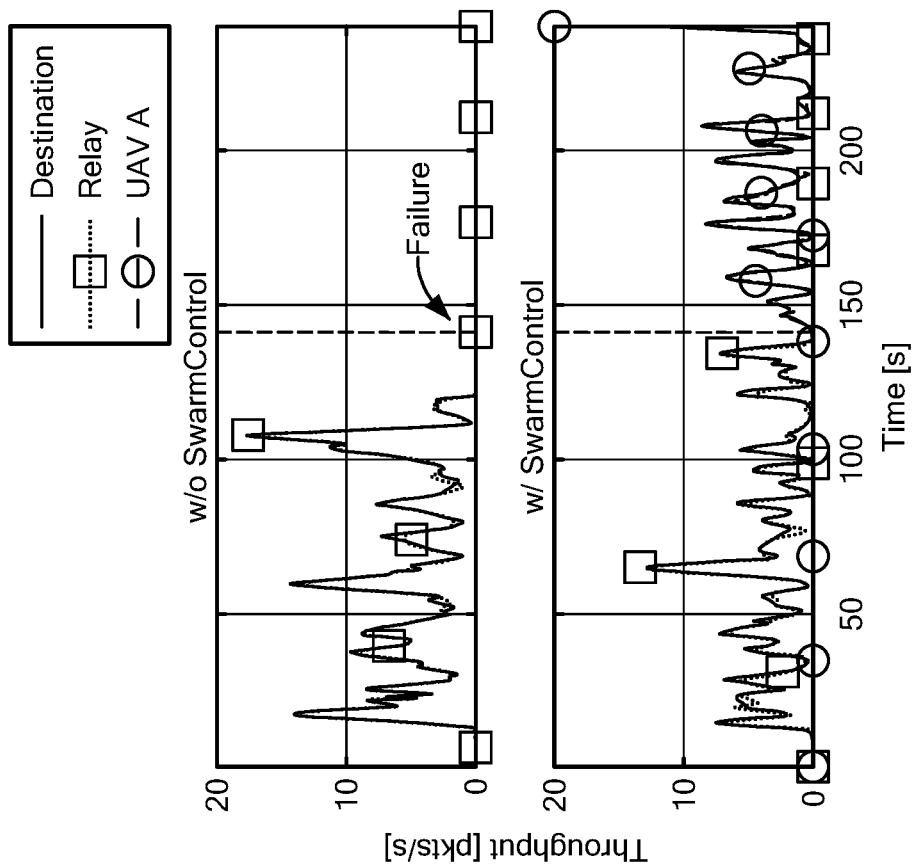
FIG. 9B is a graphical comparison of average throughput of the recovered network between SwarmControl and no control after UAV-aided failure recovery as applied in connection with the positioning configuration of FIG. 9A in accordance with various embodiments.
Figure 9A:
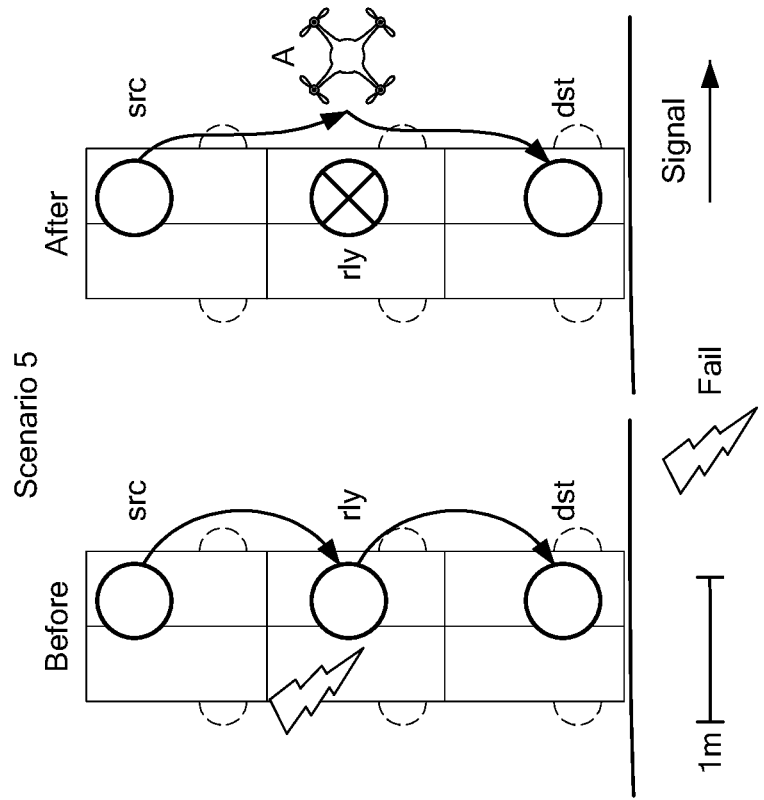
FIG. 9A is a schematic diagram illustrating a UAV-aided failure recovery positioning configuration in accordance with various embodiments.

Referring now to Scenario 5 (FIG. 9A), the network failure recovery performance was demonstrated. In such applications, the Drone-SDR is employed to restore the connectivity of a partitioned two-hop wireless ground network to overcome a ground node failure. Specifically, it was observed, as shown in FIG. 9B, that following the relay node failure, at the 140th second, SwarmControl routing models rapidly restored the network connectivity between source and destination by rerouting the overheard backlogged traffic through a Drone-SDR node, resulting in minimal throughput degradation.

Figure 10B:
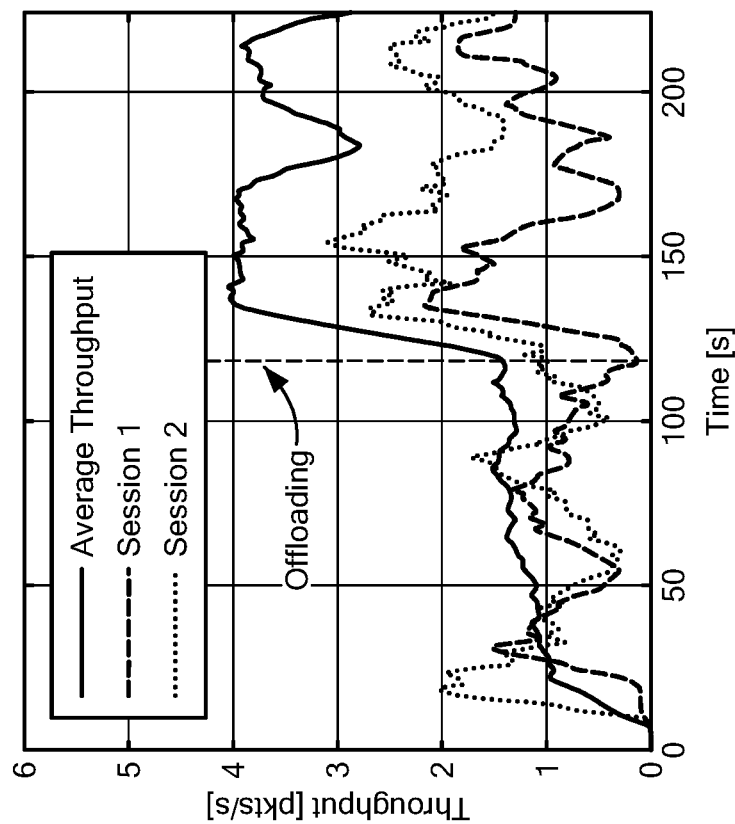
FIG. 10B is a graphical comparison of average throughput of the recovered network between SwarmControl and no control after UAV-aided network offloading as applied in connection with the positioning configuration of FIG. 10A in accordance with various embodiments.
Figure 10A:
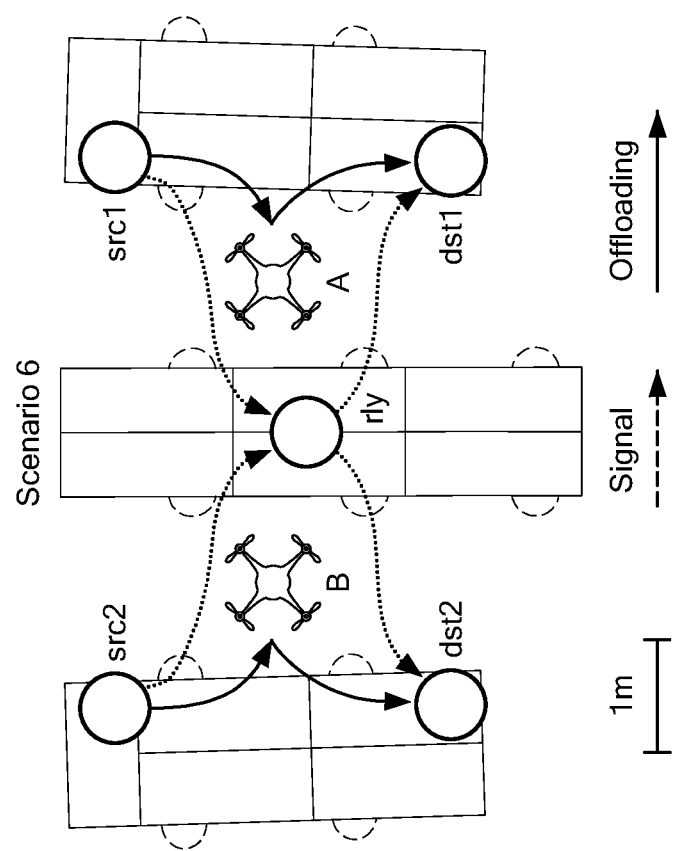
FIG. 10A is a schematic diagram illustrating a UAV-aided network offloading positioning configuration in accordance with various embodiments.

Similarly, in Scenario 6 (FIG. 10A) the effectiveness of SwarmControl was demonstrated in assisting an overloaded ground infrastructure by offloading the traffic through two Drone-SDRs toward congestion relief and overall network throughput improvement. As shown in FIG. 10B, at the 120th second SwarmControl optimizes its routing policies to automatically forward the overheard traffic and offload the congested ground relay by employing two Drone-SDR nodes. Correspondingly, the network implements a Max-rate control problem and achieves more than 100% throughput gain.

UAV Relay Network

Figure 11A:
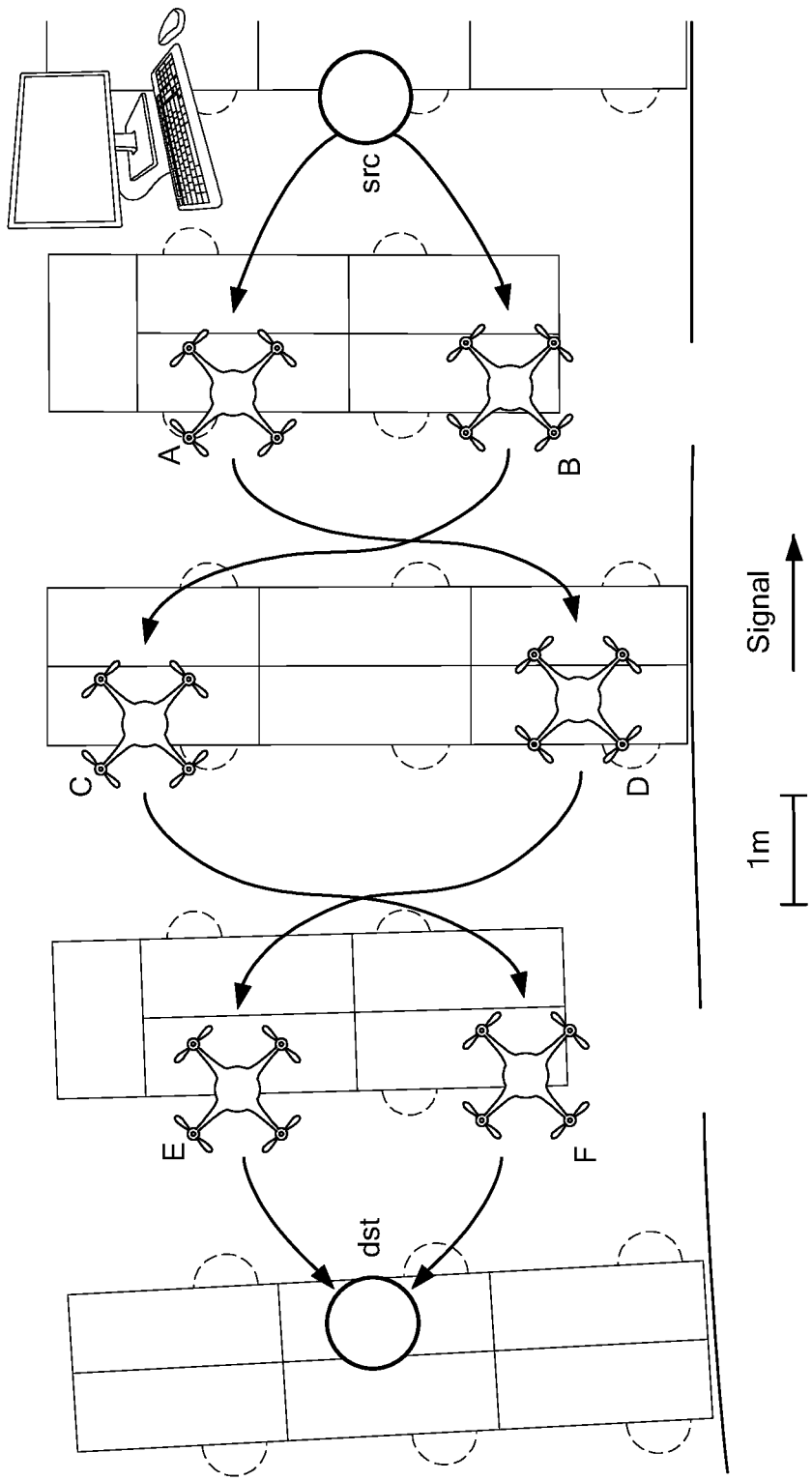
FIG. 11A is a schematic diagram illustrating a UAV swarm network relay positioning configuration in accordance with various embodiments.

Some challenging scenarios, e.g., a disaster scenario where the entire existing network infrastructure is disrupted, require more than a single node failure recovery or simple network offloading. The effectiveness of SwarmControl was demonstrated for a six-UAV wireless network used to restore and optimize the network connectivity following a ground infrastructure collapse. Scenario 7 in FIG. 11A presents two ground nodes, source and destination, unable to communicate, and a multi-hop aerial relay network of six (6) Drone-SDRs deployed to restore the connectivity.

Figure 11B:
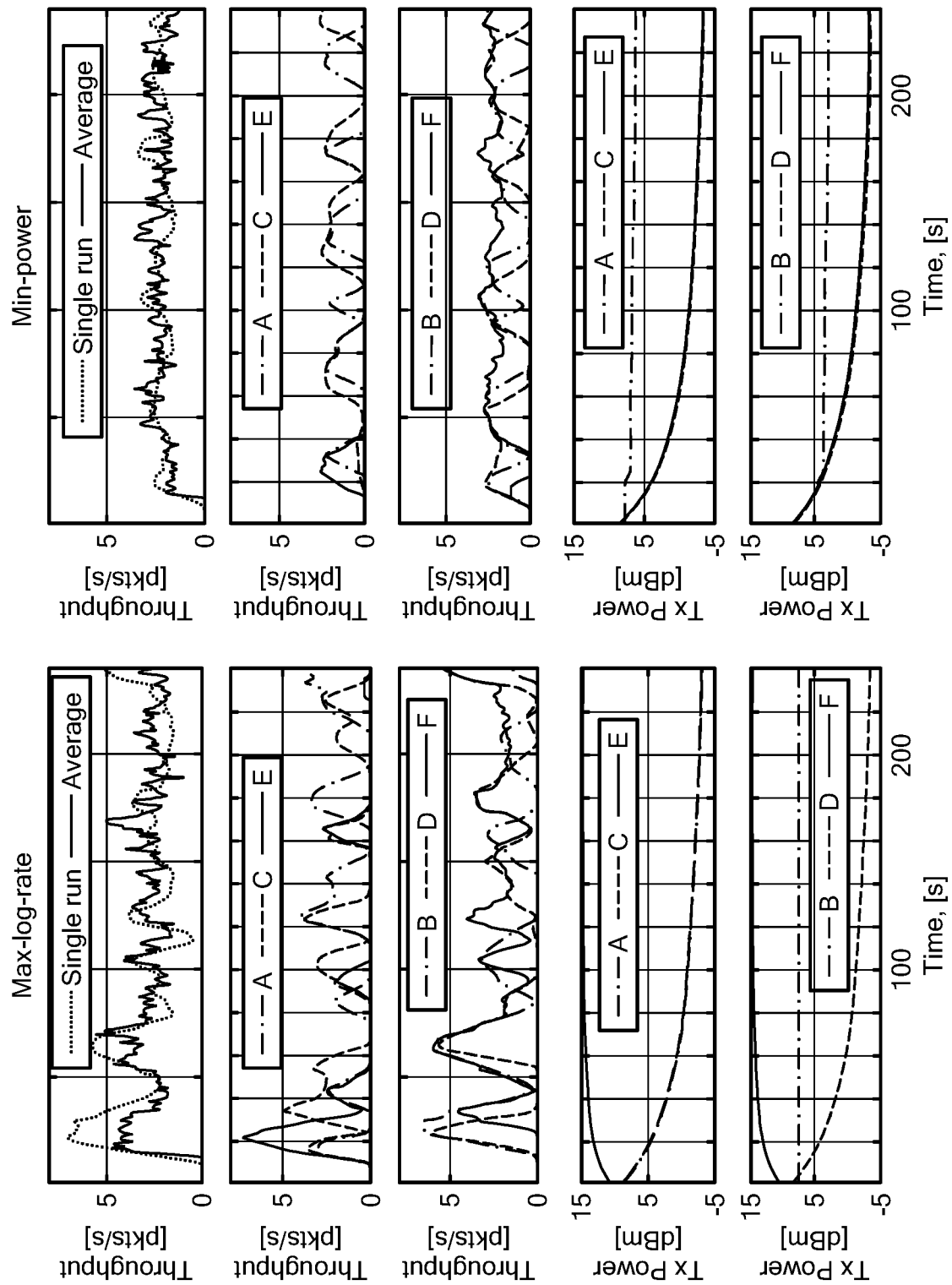
FIG. 11B is a graphical comparison between network performance using different network performance directives as applied in connection with the positioning configuration of FIG. 11A in accordance with various embodiments.

FIG. 11B reports the performance of the relay UAV network for two different control problems, namely Max-log-rate and Min-power. The bottom of the figure presents the single-run individual optimal transmission power values of the six Drone-SDRs for each control problem. The top of the figure instead reports the individual forwarding rates contribution of the six Drone-SDRs achieving optimal traffic distribution across the network, together with the overall recovered network throughput for the considered single run and an average over ten four-minute long experiments. It can be seen that Drone-SDRs use higher transmission power implementing Max-log-rate control problem compared to Min-power.

Overall, the results prove that the relay UAV network can successfully implement different control objectives. For example, node E uses over 20 dBm higher transmission power and accordingly relays over 20% more packets per second in Max-log-rate control problem realization. These higher individual forwarding rates translate into an overall network throughput improvement up to 100%.

Open Sky Experiments

Figure 12:
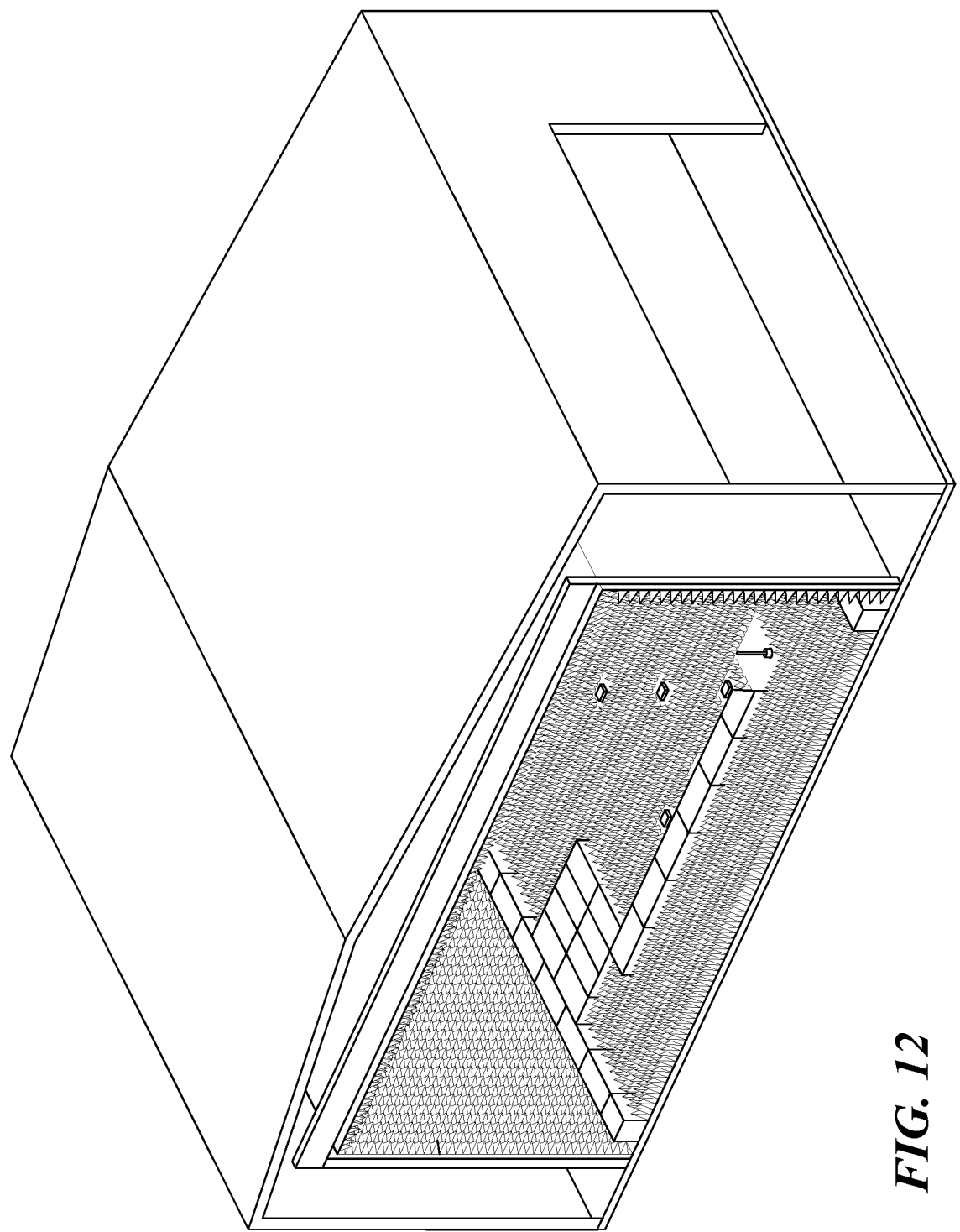
FIG. 12 is a perspective view of a UAV swarm network testing lab in accordance with various embodiments.
Figure 13:
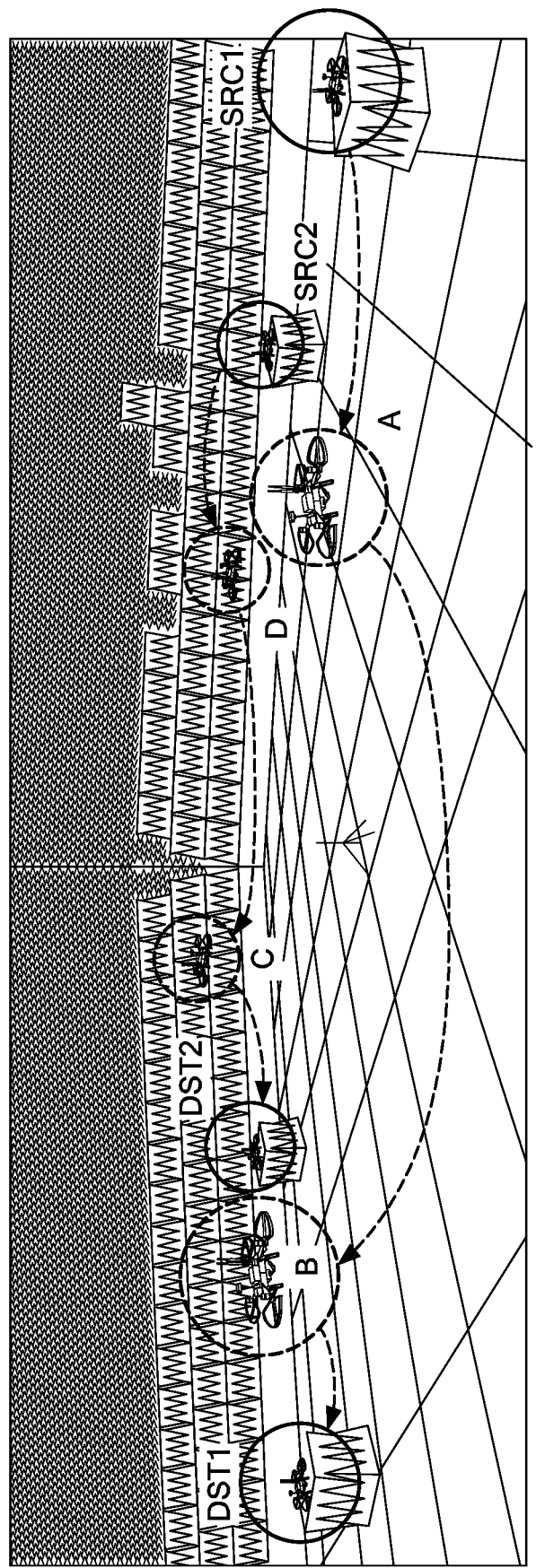
FIG. 13 is a perspective view of a UAV swarm network during test within the lab of FIG. 12 in accordance with various embodiments.

Evaluation concluded with extensive flight experiments conducted in a state-of-the-art UAV lab built to allow UAV flight testing in an indoor RF controlled environment. The facility, as illustrated in FIGS. 12 and 13, is a 15 m×15 m×7 m anechoic chamber, entirely shielded both outdoors and indoors. The chamber also contains 0.5 m hi-performance RF absorbing pyramidal foam that covers all surfaces. The absorbers were removed from the floor to simplify take-off and landing operations (see FIG. 13). The shielded enclosure establishes >100 dB of isolation between 300 MHz and 18 GHz, while the foam creates an environment simulating free-space transmission that can be used as open sky environment for UAV network testing. Even though the absorbing walls and the anechoic chamber create ideal conditions for radio communications, the total absence of Global Positioning System signal and Earth's magnetic field pose severe challenges to distributed flight coordination. To mitigate the absence of universal reference signals, we equipped our Drone-SDR prototypes with high frame-per-second optical flow cameras and a sonar to determine local positioning and ground distance. The flight controller automatically adapts the new hardware as primary positioning system without requiring any modification of the Drone PPS.

In this set of experiments, we evaluated the effectiveness and flexibility of SwarmControl distributed optimization spanning all layers of the prototyped PPS: motion, physical, network, and transport layers. To that end, we compared SwarmControl's performance with three other control schemes: Best Response (BR), No Control (NC) and WNOS. WNOS is a recently developed open-source wireless operating system for infrastructure-less ad hoc wireless networks, with code openly available on the project website. We conducted our evaluation on an eight-UAV swarm flying wireless network under the Max-log-rate control problem, in two different deployments scenarios, Scenarios 8 (FIG. 14A) and 9 (FIG. 14C). The two scenarios differ for the initial locations of the four relay Drone-SDRs and their relative distances from the two source/destination pairs. Different initial locations imply different initial SINR conditions and accordingly different intermediate operational points. Similar to previous experiments, two source nodes opening two sessions toward two destinations were considered, while the rest of the network participates in multi-hop traffic forwarding. The mobility of all source and destination Drone-SDRs was constrained by setting them to "hold mode", while letting the other Drone-SDRs free to move according to the network optimization results.

Figure 14B:
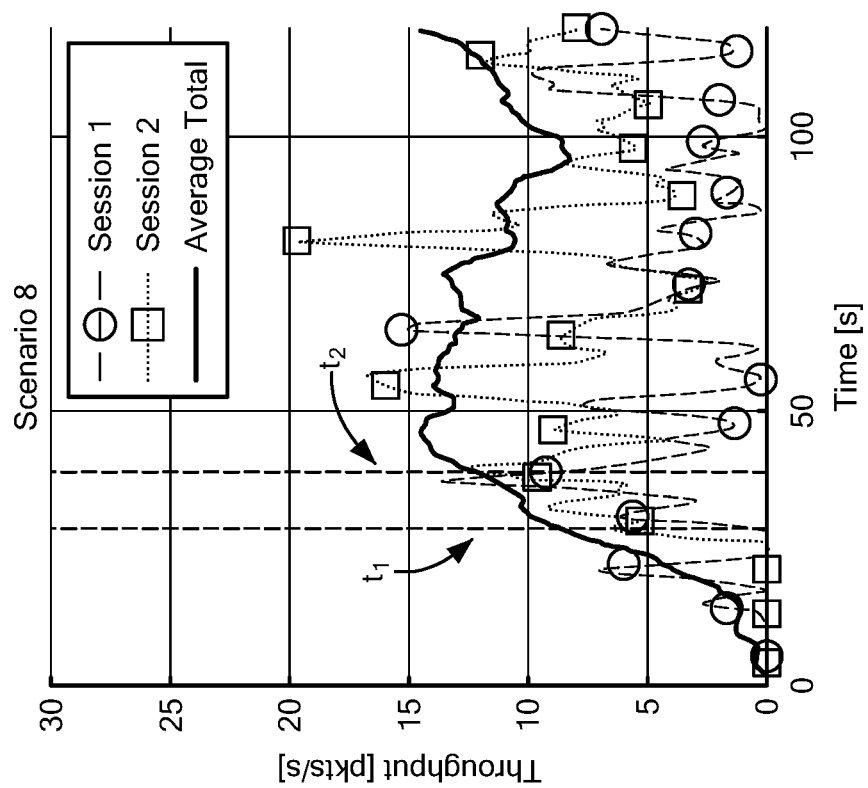
FIGS. 14B & 14D are graphical comparisons of average throughput of the network for each positioning configuration shown in FIGS. 14A & 14C using SwarmControl in accordance with various embodiments.
Figure 14A:
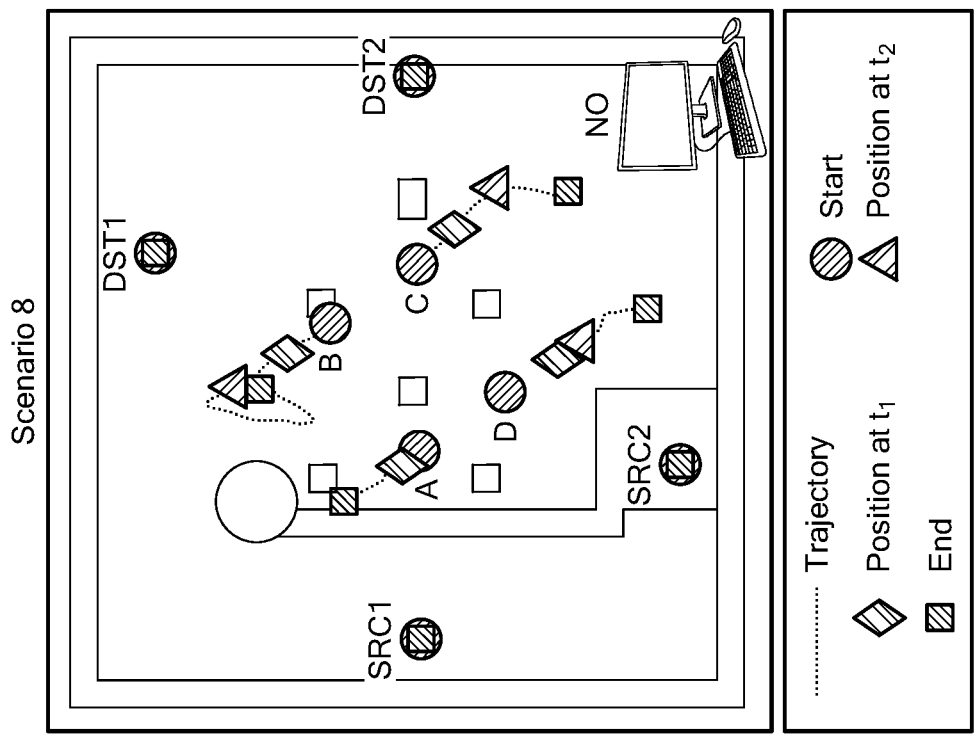
FIGS. 14A & 14C are schematic diagrams illustrating UAV swarm positioning configurations as flight tested in accordance with various embodiments.
Figure 14D:
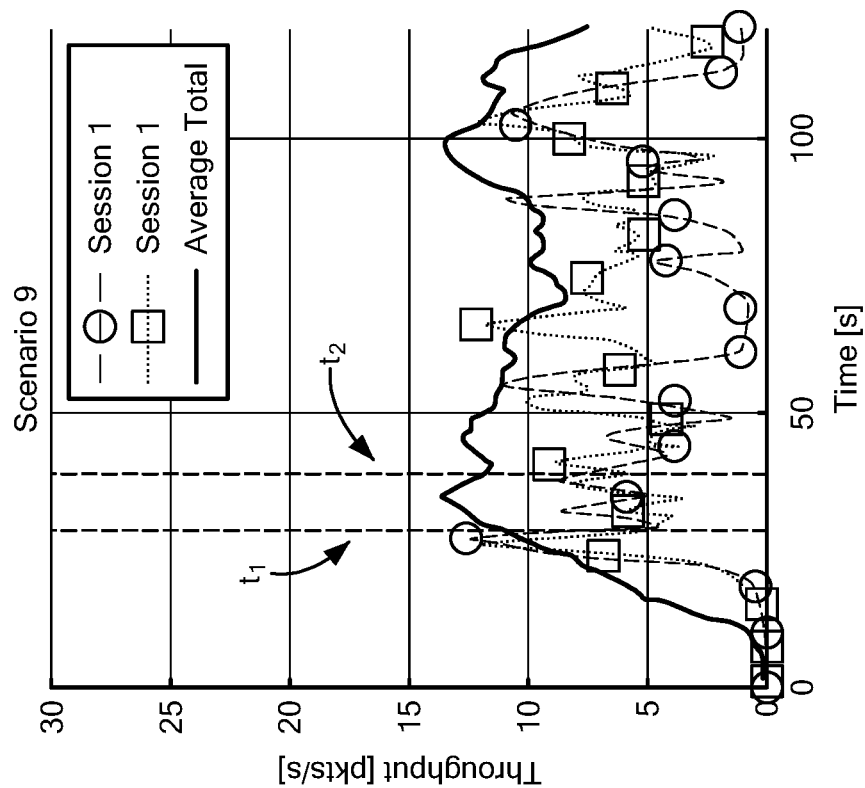
Figure 14C:
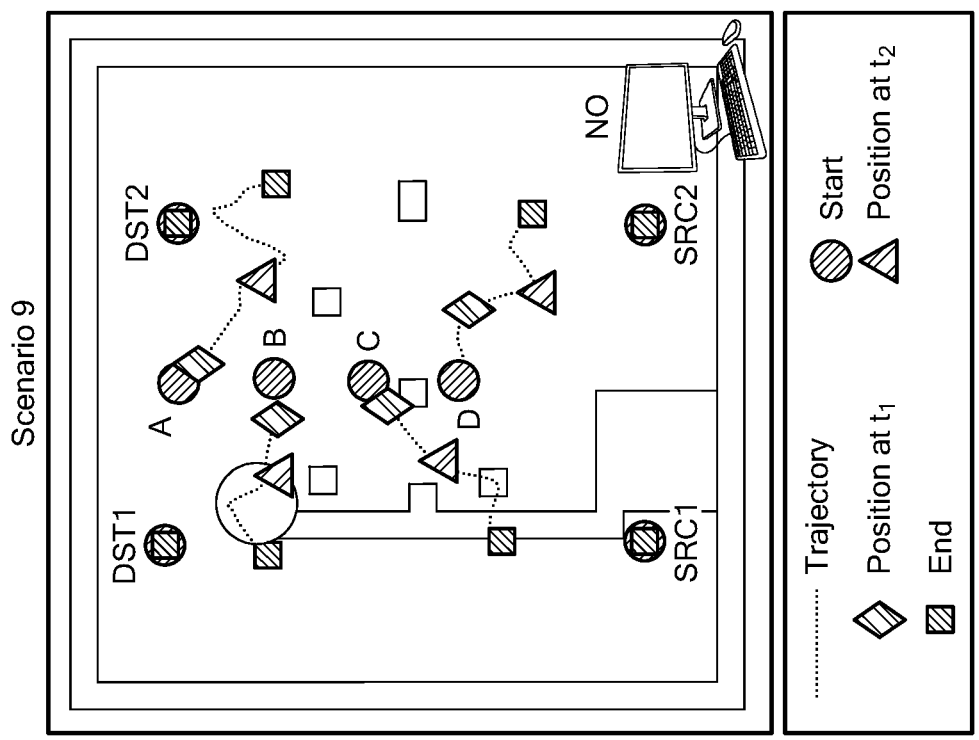

In FIGS. 14B (Scenario 8) and 14D (Scenario 9), we present single-run experiments for the two scenarios. It can be seen that SwarmControl implements network control directives by automatically optimizing networking and flight control strategies at each Drone-SDR in a distributed fashion. More specifically, FIGS. 14A-D highlight the manner in which individual Drone-SDRs distributively optimize their trajectories to improve the SINR of the individual session links. For both initial deployment scenarios, the trajectories of the drones over time were observed converging toward a reduced mutual interference topology, which eventually results in increased network capacity and overall network throughput improvement.

Figure 15A:
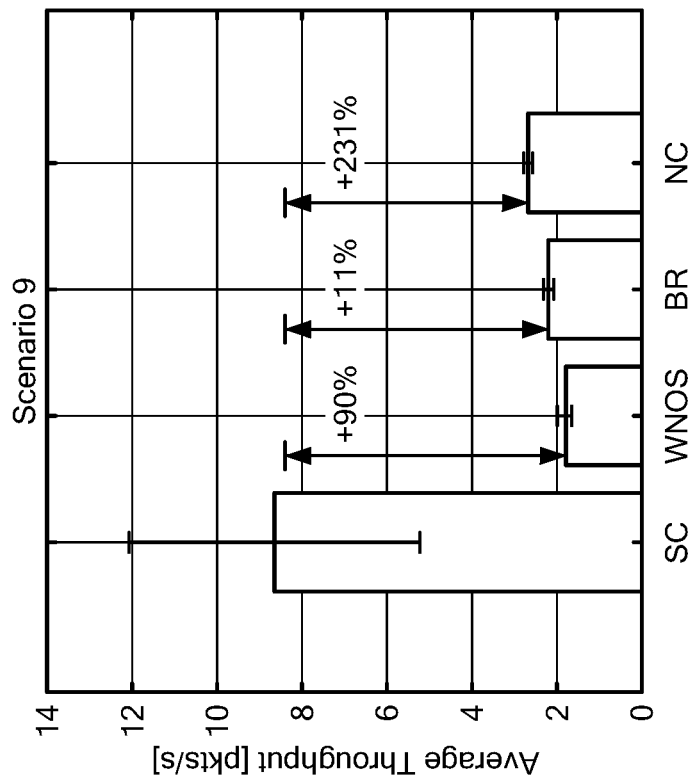
FIGS. 15A & 15B are graphical comparisons of average throughput of the network using SwarmControl, a BR learning algorithm, a NC baseline, and a wireless network operating system ("WNOS") as applied in connection with each of the positioning configurations of FIGS. 14A & 14C in accordance with various embodiments.
Figure 15B:
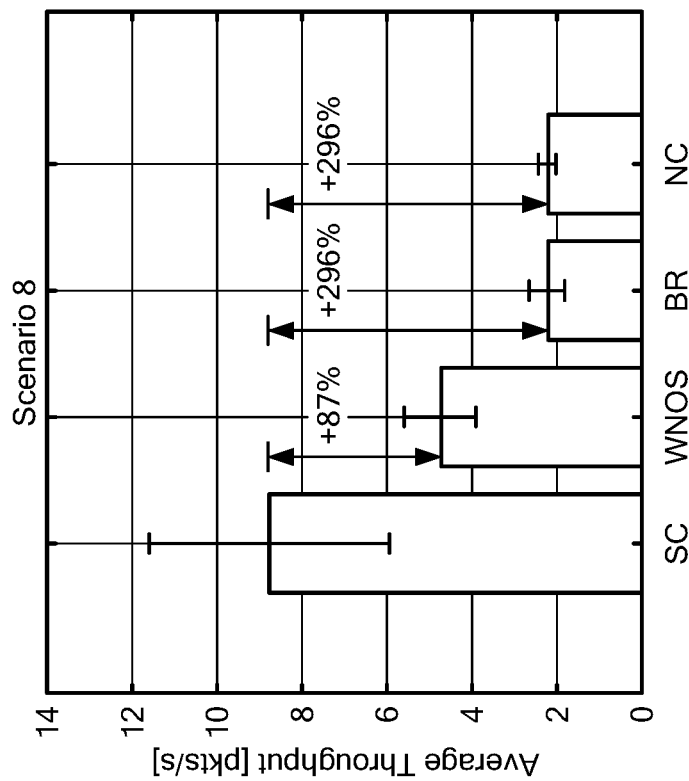

For each control scheme and deployment scenario, ten independent two-minute long flight experiments were conducted. As shown in FIGS. 15A & 15B, SwarmControl obtained an average throughput gain of 87% and 231% over the second-best performer for Scenario 8 and Scenario 9, respectively. This verifies the effectiveness of SwarmControl's unique joint networking and flight control optimization approach.

Systems and methods are thus provided herein for a control framework for UAV networks. The system and methods leverage the reconfigurability and flexibility of UAVs, particularly when endowed with software defined radios to provide the network operator with an abstraction of the motion and networking functionalities. This centralized abstraction can be used to define the desired network behavior through a few lines of code. The systems and methods automatically transform centralized control directives into distributed optimization problems that are decoupled, dispatched to and solved distributively at individual UAVs. SwarmControl was implemented on an SDR-based UAV network platform prototype, and we have assessed its performance through an extensive experimental campaign. Performance evaluation results demonstrate that SwarmControl provides flexibility, fast adaptability, and throughput gains up to 230% when compared to previous state-of-the-art solutions.

As used herein, "consisting essentially of" allows the inclusion of materials or steps that do not materially affect the basic and novel characteristics of the claim. Any recitation herein of the term "comprising", particularly in a description of components of a composition or in a description of elements of a device, can be exchanged with "consisting essentially of" or "consisting of".

While the present invention has been described in conjunction with certain preferred embodiments, one of ordinary skill, after reading the foregoing specification, will be able to effect various changes, substitutions of equivalents, and other alterations to the compositions and methods set forth herein.

What is claimed is:

1. A method for controlling an unmanned aerial vehicle (UAV) swarm network comprising:
   receiving, at a control terminal, an operator input defining a plurality of network performance directives;
   constructing a network control model representing the plurality of network performance directives;
   decomposing the network control model into a plurality of sub-models, wherein the decomposition includes one or more of horizontal decomposition of horizontal couplings characterized by cross-node dependencies among variables controlled by different UAVs, vertical decomposition of vertical couplings characterized by cross-layer dependencies among variables controlled by the same UAV but belonging to different layers, or combinations thereof;
   generating, via the control terminal, a respective distributed UAV control model corresponding to each of the distributed sub-models;
   transmitting the generated distributed UAV control models to each of a plurality of UAVs of the UAV swarm network;
   executing, at each of the plurality of UAVs, at least one of the distributed UAV control models; and
   changing, responsive to the execution of the distributed UAV control models, an operating condition of at least one of the plurality of UAVs to satisfy the network performance directives by controlling one or more of a flight computer, a motor, a sensor, a camera, a propeller, a fan, an actuator, a servo, a control surface, an antenna, a sensor, a camera, a transceiver, a software-defined radio, a network router, or combinations thereof to change one or more of an altitude of the UAV, a trajectory of the UAV, a velocity of the UAV, an attitude of the UAV, a flight pattern of the UAV, a broadcast power, a transmission pattern, a transmission direction, a receive direction, a receive pattern, a network protocol, or combinations thereof.

2. The method of claim 1, wherein the plurality of network performance directives includes prioritization, quantification, or both of one or more of energy consumption, QoS requirements, network protocols, network throughput, network data rate, geographic network coverage, or combinations thereof.

3. The method of claim 1, wherein the plurality of network performance directives includes prioritization, quantification, or both of one or more of geographic UAV location, altitude, flight speed, dwell time, proximity requirements, return-to-base conditions, or combinations thereof.

4. The method of claim 1, wherein the step of executing further comprises retrieving real-time network state information.

5. The method of claim 4, wherein the real-time network state information includes one or more of locations of the plurality of UAVs, a network signal to noise ratio (SNR), routing tables, a queue status, battery levels of the plurality of UAVs, a ground distance, a TCP congestion window, a routing path, a transmission power, a modulation scheme, or combinations thereof.

6. The method of claim 1, wherein the step of decomposition is performed by one or more of partial linearization, Taylor series linearization, Lagrangian duality, or combinations thereof.

7. The method of claim 4, further comprising:
   retrieving updated real-time network state information;
   executing, at each of the plurality of UAVs responsive to retrieval of the updated real-time network state information, at least one of the distributed UAV control models, at least one updated distributed UAV control model, or a combination thereof; and
   changing, responsive to the execution of the distributed UAV control models or updated distributed UAV control models, a current operating condition of at least one of the plurality of UAVs.

8. A system for controlling an unmanned aerial vehicle (UAV) swarm network comprising:
   a control terminal, having a memory and a processor, the memory including instructions that, when executed by the processor cause the control terminal to:
   receive an input defining a plurality of network performance directives;
   construct a network control model representing the plurality of network performance directives,
   decompose the network control model into a plurality of sub-models, wherein the decomposition includes one or more of horizontal decomposition of horizontal couplings characterized by cross-node dependencies among variables controlled by different UAVs, vertical decomposition of vertical couplings characterized by cross-layer dependencies among variables controlled by the same UAV but belonging to different layers, or combinations thereof;
generate a respective distributed UAV control model corresponding to each of the distributed sub-models, and
transmit the generated distributed UAV control models to each of a plurality of UAVs of the UAV network; and
the plurality of UAVs, each configured to:
execute at least one of the distributed UAV control models; and
change, responsive to the execution of the distributed UAV control models, an operating condition of at least one of the plurality of UAVs to satisfy the network performance directives by controlling one or more of a flight computer, a motor, a sensor, a camera, a propeller, a fan, an actuator, a servo, a control surface, an antenna, a sensor, a camera, a transceiver, a software-defined radio, a network router, or combinations thereof to change one or more of an altitude of the UAV, a trajectory of the UAV, a velocity of the UAV, an attitude of the UAV, a flight pattern of the UAV, a broadcast power, a transmission pattern, a transmission direction, a receive direction, a receive pattern, a network protocol, or combinations thereof.

9. The system of claim 8, wherein the plurality of network performance directives includes prioritization, quantification, or both of one or more of energy consumption, QoS requirements, network protocols, network throughput, network data rate, geographic network coverage, or combinations thereof.

10. The system of claim 8, wherein the plurality of network performance directives includes prioritization, quantification, or both of one or more of geographic UAV location, altitude, flight speed, dwell time, proximity requirements, return-to-base conditions, or combinations thereof.

11. The system of claim 10, wherein the return-to-base conditions include a minimum threshold detected battery life, a prescribed return time, a failure detection, detection of an atmospheric condition, impact detection, or combinations thereof.

12. The system of claim 8, wherein executing at least one of the distributed UAV control models further comprises retrieving real-time network state information.

13. The system of claim 8, wherein decomposing the network control model further comprises one or more of partial linearization, Taylor series linearization, Lagrangian duality, or combinations thereof.

14. The system of claim 12, wherein each of the plurality of UAVs is further configured to:
retrieve updated real-time network state information;
re-execute, responsive to retrieval of the updated real-time network state information, at least one of the distributed UAV control models, at least one updated distributed UAV control model, or a combination thereof; and
change, responsive to the execution of the distributed UAV control models or updated distributed UAV control models, a current operating condition of at least one of the plurality of UAVs.

* * * * *